(12) United States Patent
Wang et al.

(10) Patent No.: US 12,135,940 B2
(45) Date of Patent: Nov. 5, 2024

(54) METHOD FOR KEYWORD EXTRACTION AND ELECTRONIC DEVICE IMPLEMENTING THE SAME

(71) Applicant: Samsung Electronics Co., Ltd., Suwon-si (KR)

(72) Inventors: Huadong Wang, Beijing (CN); Song Liu, Beijing (CN); Xiangfeng Meng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 17/142,566

(22) Filed: Jan. 6, 2021

(65) Prior Publication Data

US 2021/0209356 A1    Jul. 8, 2021

(30) Foreign Application Priority Data

Jan. 6, 2020   (CN) .......................... 202010011174.3

(51) Int. Cl.
*G06F 40/295*  (2020.01)
*G06F 16/583*  (2019.01)
(Continued)

(52) U.S. Cl.
CPC .......... *G06F 40/295* (2020.01); *G06F 40/279* (2020.01); *G06V 10/82* (2022.01); *G06V 30/19173* (2022.01); *G06V 30/40* (2022.01); *G06V 30/416* (2022.01); *G06V 30/10* (2022.01)

(58) Field of Classification Search
None
See application file for complete search history.

(56) References Cited

U.S. PATENT DOCUMENTS 11,636,251 B2 *   4/2023  Kadia ................. G06V 10/764
                                                                  715/269
2012/0288203 A1   11/2012  Pan et al.
(Continued)

FOREIGN PATENT DOCUMENTS

CN    108596168 A  *  9/2018  ........... G06K 9/2054
CN    108764007 A  *  11/2018
(Continued)

OTHER PUBLICATIONS

International Search Report and written opinion dated Apr. 15, 2021, issued in International Application No. PCT/KR2021/000087.

*Primary Examiner* — Mohammed Rachedine
(74) *Attorney, Agent, or Firm* — Jefferson IP Law, LLP

(57) ABSTRACT

A method for keyword extraction, an apparatus, an electronic device, and a computer-readable storage medium, which relate to the field of artificial intelligence are provided. The method includes collecting feature information corresponding to an image to be processed, the feature information including text representation information and image visual information and then extracting keywords from the image to be processed based on the feature information. The text representation information includes text content and text visual information corresponding to each text line in the image to be processed. The method for keyword extraction, apparatus, electronic device, and computer-readable storage medium provided in the embodiments of the disclosure may extract the keywords from an image to be processed.

21 Claims, 19 Drawing Sheets

(51) Int. Cl.
_G06F 40/242_ (2020.01)
_G06F 40/279_ (2020.01)
_G06V 10/22_ (2022.01)
_G06V 10/82_ (2022.01)
_G06V 30/19_ (2022.01)
_G06V 30/40_ (2022.01)
_G06V 30/416_ (2022.01)
_G06V 30/10_ (2022.01)

(56) References Cited

U.S. PATENT DOCUMENTS

| | | | |
|---|---|---|---|
| 2015/0138220 A1* | 5/2015 | Chapman | G06V 30/245 |
| | | | 345/589 |
| 2016/0189314 A1* | 6/2016 | Nakayama | G06V 30/412 |
| | | | 705/30 |
| 2018/0260698 A1* | 9/2018 | Lin | G06V 10/82 |
| 2018/0342061 A1 | 11/2018 | Xiang et al. | |
| 2019/0180154 A1* | 6/2019 | Orlov | G06F 40/289 |
| 2021/0174109 A1* | 6/2021 | Beller | G06V 30/416 |
| 2021/0232847 A1 | 7/2021 | Yue et al. | |

FOREIGN PATENT DOCUMENTS

| | | | | |
|---|---|---|---|---|
| CN | 110659640 A | | 1/2020 | |
| CN | 113051966 A | * | 6/2021 | G06K 9/00718 |
| KR | 10-2012-0127208 A | | 11/2012 | |
| KR | 10-2097125 B1 | | 4/2020 | |
| WO | WO-2020097734 A1 | * | 5/2020 | G06F 16/538 |
| WO | WO-2020113561 A1 | * | 6/2020 | G06F 16/38 |

\* cited by examiner

FIG. 12

SCIENTIFIC ARTICLES

Title: XXXX
Abstract: XXXXXXXXXX

Keywords:
xx, xxx, xxxx

IMAGE DATABASE

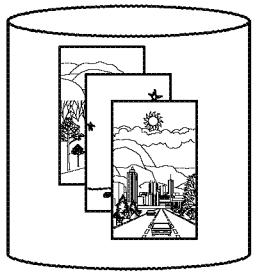

SYNTHETIC CORPUS

Numerical solution of a three-dimensional solidification problem in aluminium casting ?

In this paper, we consider an enthalpy formulation for a two-phase Stefan problem arising from the solidification of aluminium during casting process.

We solve this free boundary problem in a time varying three-dimensional domain and consider convective heat transfer in the liquid phase.

The resulting equations are discretized using a characteristics method in time and a finite element method in space, and we propose a numerical algorithm to solve the obtained nonlinear discretized problem. Finally, numerical results are given which are compared with industrial experimental measurements.

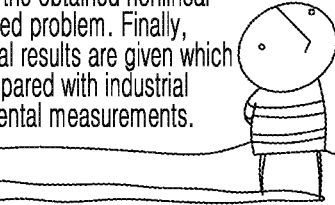

KEYWORDS

Keywords:
xx, xxx, xxxx

SYNTHETIC IMAGE

TRANSFORMER ENCODER BLOCK

METHOD FOR KEYWORD EXTRACTION AND ELECTRONIC DEVICE IMPLEMENTING THE SAME

CROSS-REFERENCE TO RELATED APPLICATION(S)

This application is based on and claims priority under 35 U.S.C. § 119(a) of a Chinese patent application number 202010011174.3, filed on Jan. 6, 2020, in the Chinese Intellectual Property Office, the disclosure of which is incorporated by reference herein in its entirety.

BACKGROUND

1. Field

The disclosure relates to the field of artificial intelligence technology. More particularly, the disclosure relates to a method for keyword extraction, apparatus, electronic device, and computer-readable storage medium.

2. Description of Related Art

With the development of information technology, the image processing technology has developed. Now more and more information may be displayed through images, and images are more and more widely used in our lives, for example, the mobile phone screenshots, posters, notes all appear as images.

Wherein, because images contain a lot of important information, usually, we need to obtain key information from these images to help users perform image tag editing and quick retrieval of images through these pieces of key information. For example, in the case that the user wants to find images containing "Jurassic World" from multiple images, if keywords may be extracted from these images, the user may input "Jurassic World" to quickly find the target image from these images.

Therefore, how to extract keywords from images becomes an important issue to be solved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for keyword extraction, apparatus, electronic device, and computer-readable storage medium, which may solve at least one of the foregoing technical problems. The technical solution is shown as follows.

Additional aspects will be set forth in part in the description which follows and, in part, will be apparent from the description, or may be learned by practice of the presented embodiments.

In accordance with an aspect of the disclosure, a method for keyword extraction is provided. The method includes collecting feature information corresponding to an image to be processed, the feature information including text representation information and image visual information, and extracting keywords from the image to be processed based on the feature information, wherein the text representation information includes text content and text visual information corresponding to a text line in the image to be processed.

In accordance with another aspect of the disclosure, an apparatus for keyword extraction is provided. The apparatus includes a collection module, configured to collect feature information corresponding to an image to be processed, the feature information including text representation information and image visual information, and an extraction module, configured to extract keywords from the image to be processed based on the feature information wherein the text representation information includes text content and text visual information corresponding to the text line in the image to be processed.

In accordance with another aspect of the disclosure, an electronic device is provided. The electronic device includes one or more processors, a memory and one or more programs, wherein the one or more programs are stored in the memory and configured to be executed by the one or more processors, and the one or more programs are configured to execute the operations corresponding to the method for keyword extraction shown according to the first aspect.

In accordance with another aspect of the disclosure, a computer-readable storage medium having stored computer programs thereon is provided, when the computer programs are executed by a processor, the method for keyword extraction shown in the first aspect is implemented.

The beneficial effects brought by the technical solution provided by the disclosure are as followings.

The disclosure provides a method for keyword extraction, apparatus, electronic device, and computer-readable storage medium. Compared with the existing technology, feature information corresponding to an image to be processed is collected in the disclosure, and then based on the feature information, the keywords are extracted from the image to be processed. That is, the disclosure collects the feature information from the image to be processed to extract keywords from the image to be processed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description disclosure taken in conjunction with the accompanying drawings, in which:

FIG. 12 is a schematic diagram of synthesizing corpus based on model training according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by those skill in the art that singular forms "a," "an," "the," and "said" may be intended to include plural forms as well, unless otherwise stated. It should be further understood that terms "include/including" used in this specification specify the presence of the stated features, integers, operations, elements and/or components, but not exclusive of the presence or addition of one or more other features, integers, operations, elements, components, and/or combinations thereof. It should be understood that when a component is referred to as being "connected to" or "coupled to" another component, it may be directly connected or coupled to other elements or provided with intervening elements there between. In addition, "connected to" or "coupled to" as used herein may include wireless connection or coupling. As used herein, term "and/or" includes all or any of one or more associated listed items or combinations thereof.

To make the objectives, technical solutions, and advantages of the disclosure clearer, the embodiments of the disclosure will be described in further detail below with reference to the accompanying drawings.

Figure 1:
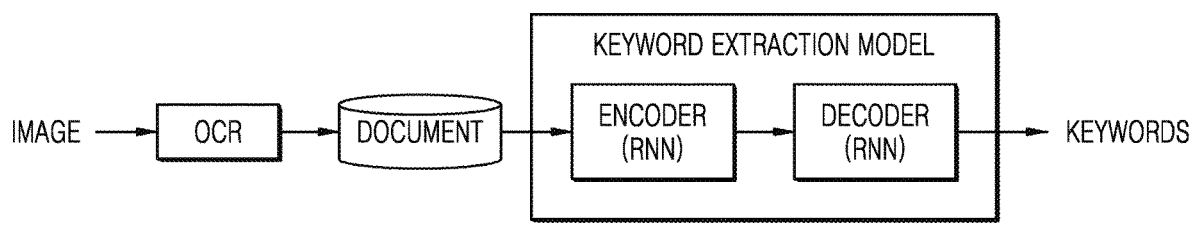
FIG. 1 is a schematic diagram of a related conventional deep learning model framework for keyword extraction according to an embodiment of the disclosure.

FIG. 1 is a schematic diagram of a related conventional deep learning model framework for keyword extraction according to an embodiment of the disclosure.

Referring to FIG. 1, the method for extracting keywords from an image may be implemented by a deep learning model based on keyword extraction. The related conventional deep learning model for the keyword extraction conforms to a framework as shown in FIG. 1, and the framework may include: an OCR tool and a keyword extraction model. The operation of extracting keywords from an image based on the framework may include specifically two operations:

1) using the OCR tool to recognize text lines in the image and string all the text lines together as a text document; and 2) using the keyword extraction model to extract keywords, through an encoder and decoder (that is, Encoder-Decoder) framework based on Recurrent Neural Network (RNN), which specific includes:

a) Input document, which is an OCR-ed text, that is, the above text document obtained by stringing all the text lines together;

b) Encoder: map the input document to a hidden layer representation through the RNN;

c) Decoder: input the hidden layer representation of the output of the encoder to the RNN-based decoder for keyword prediction.

Figure 2:
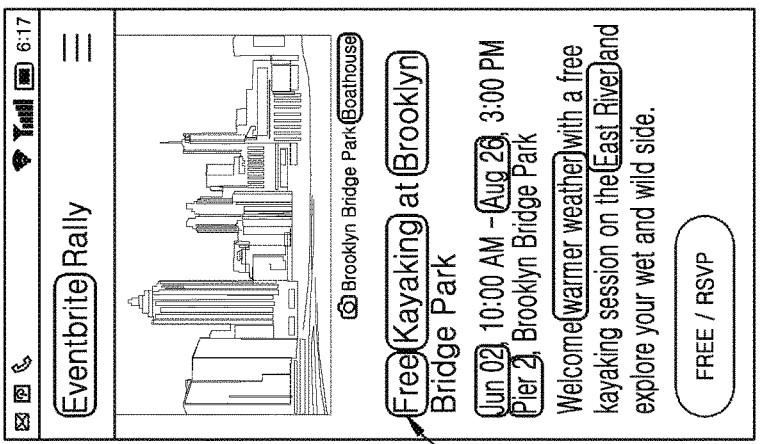
FIG. 2 is a schematic diagram of a conventional image keyword extraction process according to an embodiment of the disclosure.

FIG. 2 is a schematic diagram of a conventional image keyword extraction process according to an embodiment of the disclosure.

Referring to FIG. 2, the specific method of extracting keywords from an image using the conventional related deep learning-based keyword extraction model is introduced above. The method is further introduced through an example in following embodiment, which includes: for an image (a), recognizing the text lines in the image through the OCR tool to obtain the OCR-ed text, as shown in (b), then predicting the keywords though a keyword extraction model, as shown in (c). In an embodiment of the disclosure, the predicted keywords include multiple keywords and a score corresponding to each keyword, for example, the keywords predicted from (b) and the scores of the keywords include: "brooklyn (6.608)," "river (2.050)," "brooklyn bridge park (0.890)," "warmer weather (0.442)," "session (0.436)," "Brooklyn bridge (0.046)," "bridge park (0.031)," "Jun 02 (0.000)," "bridge (−0.515)" and "August 26 (−0.620)."

However, the conventional method of extracting keywords from an image using the related deep learning-based keyword extraction model introduced in the above embodiment may have the following technical problems:

1. The technical problems brought by the conventional method of extracting keywords from an image based on OCR.

Figure 3:
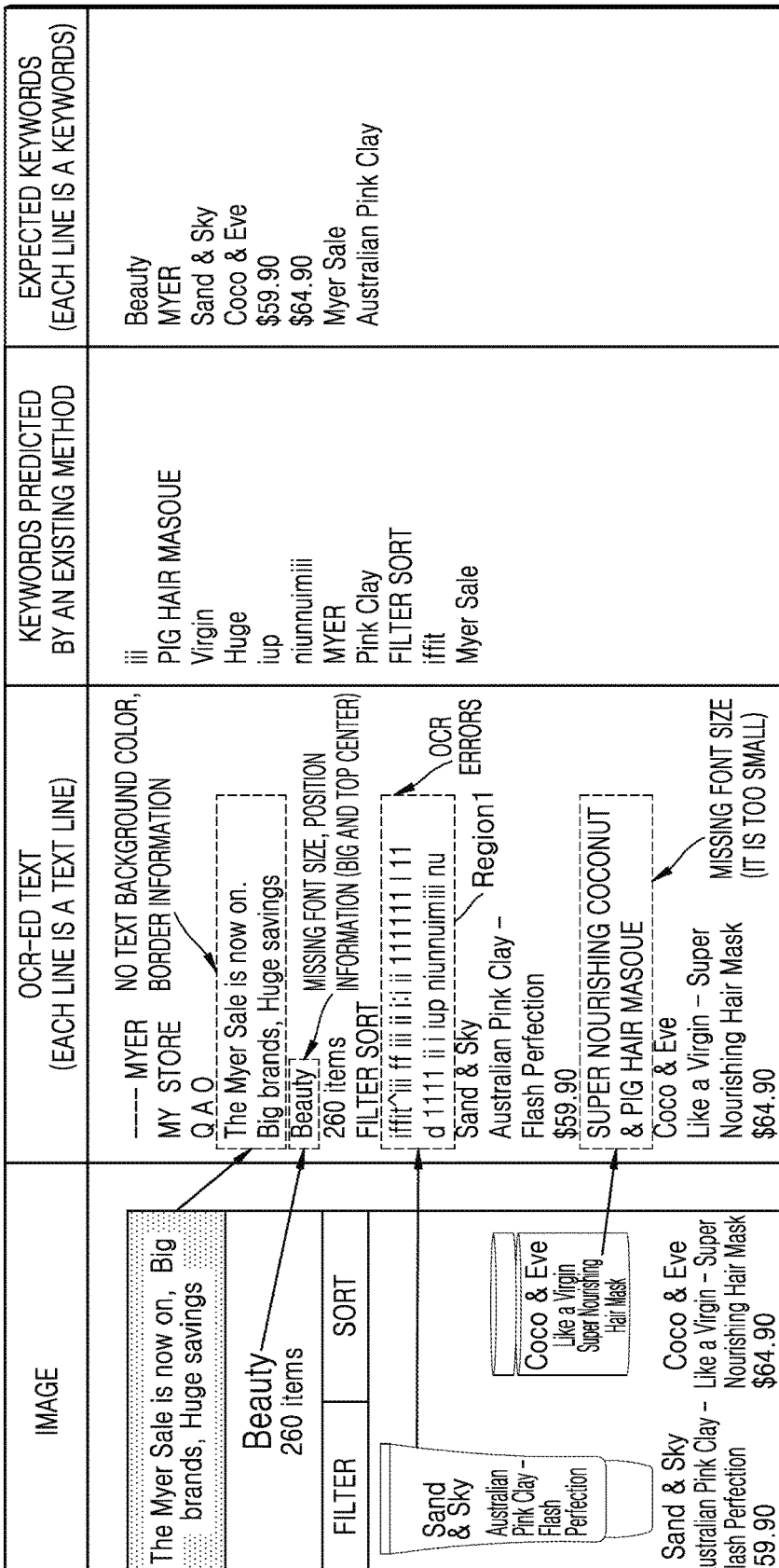
FIG. 3 is a schematic diagram of key extraction when visual information is lost and text errors occur in Optical Character Recognition (OCR) according to an embodiment of the disclosure.

(1.1) The conventional method is only based on the OCR-ed text when performing keyword extraction, and it ignores the text visual information, thereby resulting in lower accuracy of extracting keywords from an image, for example, as shown in FIG. 3.

FIG. 3 is a schematic diagram of key extraction when visual information is lost and text errors occur in Optical Character Recognition (OCR) according to an embodiment of the disclosure.

Referring to FIG. 3, a) the word "Beauty" is in the middle of the top of the image which generally indicates that it is an important word. However, it is difficult to predict "Beauty" as a keyword if only OCR-ed text is used;

b) Because the text line "The Myer Sale . . . saving" has a prominent red background, the candidate keyword "Myer Sale" should have a higher ranking score in the text line "The Myer Sale . . . saving." However, the candidate keyword "Myer Sale" with a higher ranking score in the text line "The Myer Sale . . . saving" may not be indicated through only the OCR-ed text;

c) The text line "SUPER . . . MASOUE" in the image has very small and light-colored font. Generally, the text line "SUPER . . . MASOUE" should have a low-ranking score. However, by using the conventional method, "PIG HAIR MASOUE" may have a higher-ranking score, and may be used as the extracted keyword;

d) If there is no text content in the image or the text content is insufficient, the conventional method may not generate any keyword, such that the keywords may not be extracted from the image by the above conventional method.

(1.2) OCR-ed text often has a large number of text recognition errors. If it is processed directly on the error text, it will generate inappropriate keywords, that is, the accuracy of extracting keywords from an image based on OCR-ed text is low. For example, (b) of FIG. 3 is the OCR-ed text extracted from the image (a), wherein the extracted text "iffit . . . nu" in region 1 is the error text generated by the OCR tool. Then the extracted OCR-ed text (b) is subjected to the keyword prediction by using above conventional method to obtain the predicted keywords, that is, "keywords predicted by the existing method" in FIG. 3. As shown in (c) of FIG. 3, since many error keywords are extracted from the text due to the OCR errors, such as "iii," "iup," "niunnuimiii," "iffit," etc. Furthermore, (d) of FIG. 3 shows the expected keywords, which include: "Beauty," "MYER," "Sand & Sky," "Coco & Eve," "$59.90," "$64.90," "Myer Sale," and "Australian Pink Clay." Therefore, by comparing the keywords predicted by the conventional technology and the expected keywords in FIG. 3, it is found that the coincidence degree between the keywords predicted by the conventional technology and expected keywords is low, which indicates that the OCR errors reduce the accuracy of the keyword extraction model in the conventional method.

2. Defects of conventional related deep learning-based keyword extraction model.

The conventional related deep learning-based keyword extraction model uses an RNN-based encoder and decoder framework. In the method, the encoder performs word embeddings on the document D (including: text line 1, text line 2, . . . , text line m, where the text line 1, text line 2, . . . , text line m represent the word sequence corresponding to each text line, that is, the OCR-ed text mentioned above) to obtain the content processed by the word embeddings, and then a corresponding text context representation is obtained by the RNN to realize the encoding process so as to obtain the encoded result. Further, the encoded result is decoded through a decoder to predict the corresponding keyword sequence. When the decoder predicts the words at each decoding time operation, the decoder performing an information compress on the text context representation by using the RNN layer and combining the attention mechanism to obtain a hidden layer representation of a decoding layer. Then, the probability distribution Prob (y, g) of all words in the common word dictionary and the probability distribution Prob (y, c) of the rare-used words in the input text are summed for prediction, and the predicted result is output. In the embodiment of the disclosure, y represents a word, and g and c represent a first prediction mode (generate mode) and a second prediction mode (copy mode) respectively, as shown in FIG. 4B.

Figure 4A:
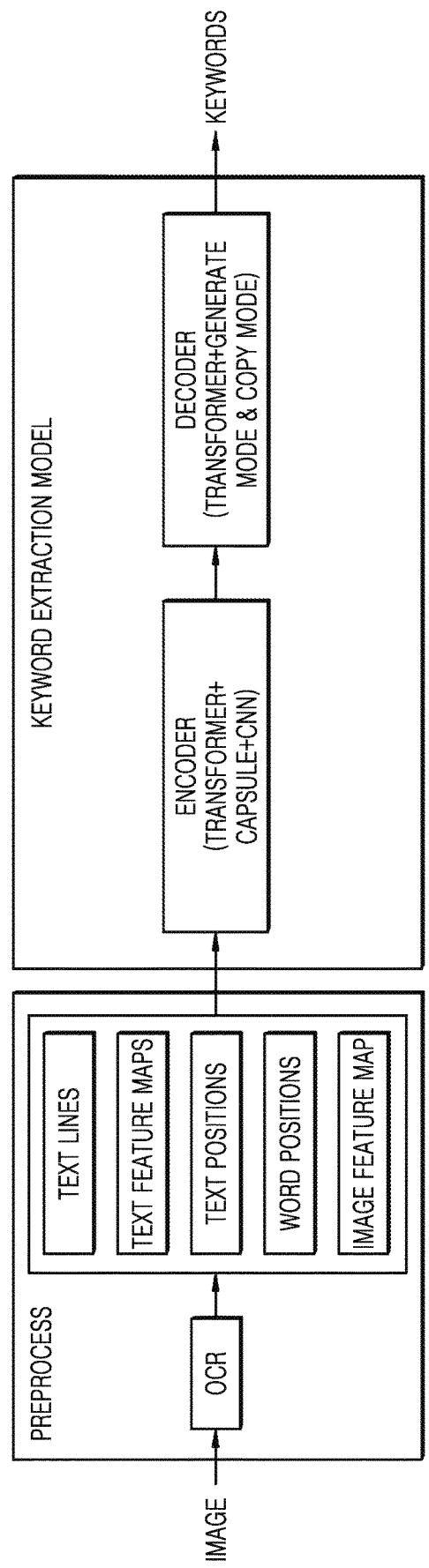
FIG. 4A is a schematic diagram of a visual keyword extraction framework according to an embodiment of the disclosure.
Figure 4B:
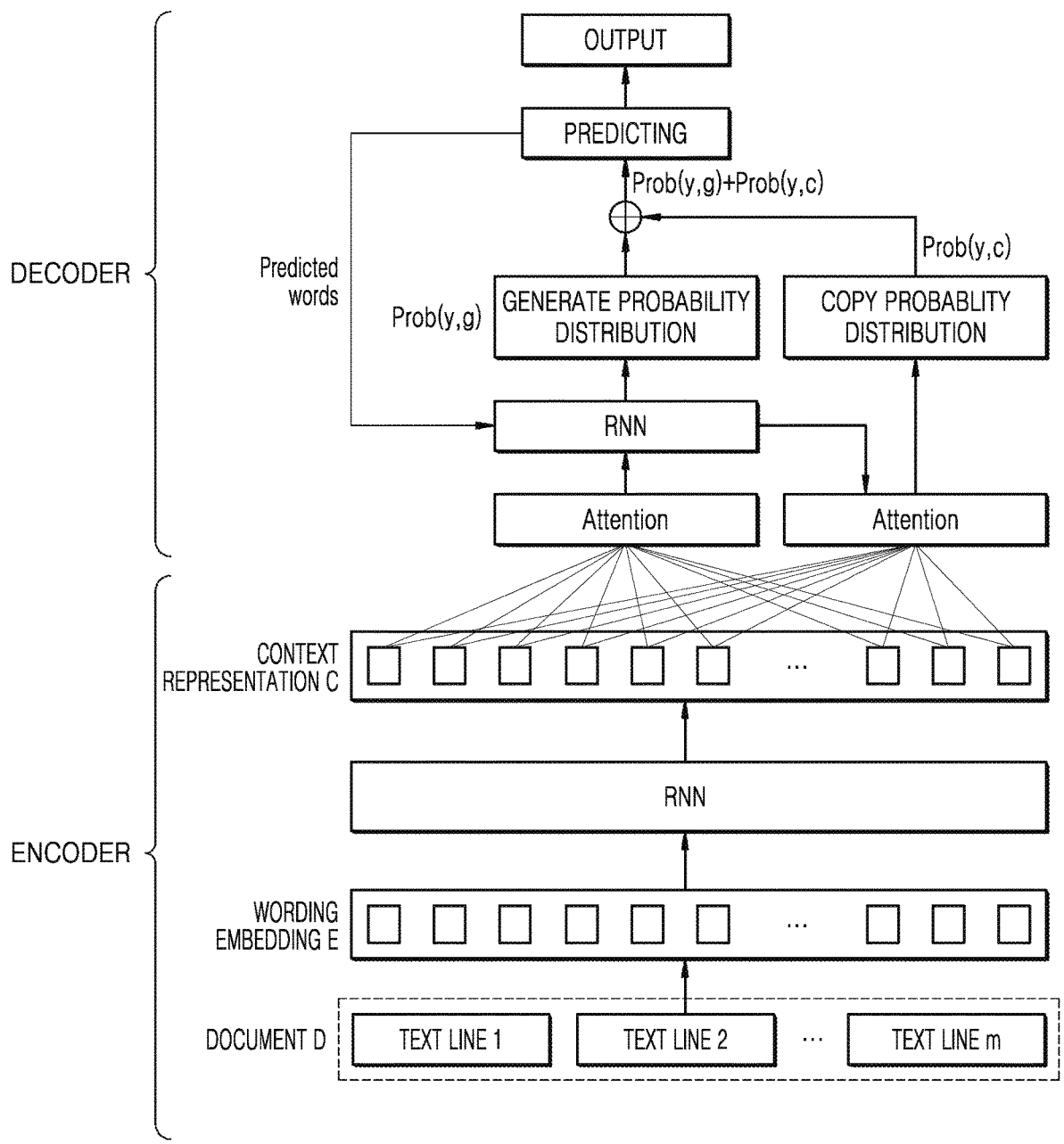
FIG. 4B is a schematic diagram of a conventional keyword extraction model framework for screenshot according to an embodiment of the disclosure.

FIG. 4B is a schematic diagram of a conventional keyword extraction model framework for screenshot according to an embodiment of the disclosure.

Wherein, the above conventional framework has the following defects.

(2.1) The RNN encoder needs to be executed on sequence data, that is, all text lines need to be serially connected together in order to form a text document as the input of the model, which will cause the spatial tree structure information existing in the text lines to be lost, such as layout information of the text lines;

(2.2) The training and inference speeds of the RNN encoder are relatively slow. This is because the RNN has to wait for the processing of all previous time operations to finish at each decoding time operation, thereby resulting in a slower prediction speed;

(2.3) The keywords generated by the conventional RNN decoder do not have a topic diversity.

For example, in FIG. 3, the image contains topic information such as "product," "website," and "price." It is expected that the extracted keywords should cover these pieces of topic information as much as possible, such as "Sand & Sky" (product), "MYER" (website), "$59.90" (price), etc. However, the keywords extracted by the existing methods do not cover the topic information of "price" and "product" (see the extracted results listed in part (c) of FIG. 3).

(2.4) When predicting words at each decoding time operation, the decoder sums the probability distribution Prob (y, g) of all words in the common word dictionary and the probability distribution Prob (y, c) of rare-used words in the input text for prediction, that is, Prob (y)=Prob (y, g)+Prob (y, c), where Prob(y) is probability distribution defined on the combined word list of the above common word dictionary and rare-used words. This prediction method inevitably introduces prediction noise. When the words to be predicted are commonly used words, the rare-used words are noise, and vice versa, when the words to be predicted are rare-used words, the commonly used words are noise.

Based on the technical problems that may exist in the existing technology described above, specific implementations are provided in the embodiments of the disclosure to solve the technical problems described above.

1) A deep learning keyword extraction model that may use multi-modal information such as text content, text visual information, and image visual information is established to enhance keyword extraction through visual information and image information. The text content, text visual information and image information are extracted simultaneously through the OCR framework. In the embodiment of the disclosure, the text visual information may be, in terms of text lines, include other observable information, in addition to the content of the text lines. For example, other observable information may include at least one of a text feature map (also may be referred to as text feature information) and text positions and word positions. Or the text visual information may be obtained through the above information. The image visual information may include an image feature map, or the image visual information may be obtained through an image feature map.

Wherein, the text content information may include text content information corresponding to each text line, and the text content information corresponding to each text line may include a word sequence corresponding to each text line module in the image. The text feature map is text line visual features obtained by using the convolution network (ConvNet) (specifically, the text feature map is obtained by combining RPN and RoI on the basis of the image feature map obtained by the convolution network (ConvNet)), which encode rich visual information of the text lines, including font size, font color, font shape, text line background color, structure information, border information and the like. The text position is the position of each text line in the image. The word position is the position in the image of each word in the corresponding text line. The image feature map, which is the convolution feature of the image, is the encoding of image information, such as object information, scenario information, action information, and the like.

FIG. 4A is a schematic diagram of a visual keyword extraction framework according to an embodiment of the disclosure.

Wherein, referring to FIG. 4A, when keyword extraction is performed on an image to be processed in the embodiment of the disclosure, the method includes: preprocessing the image to be processed to obtain text lines, text feature maps (also may be referred to as text feature information), test positions, word positions and an image feature map, and then obtaining a keyword sequence by using the keyword extraction model. Specifically, the keyword extraction model includes an encoder and a decoder, wherein the encoder is mainly consisted by transformer encoder network, capsule network and CNN network, and the decoder includes a transformer decoder network, a generate mode and a copy mode. Furthermore, the text lines, the text feature maps (also may be referred to as the text feature information), the text positions, the word positions and the image feature map, which are obtained by the preprocessing, are encoded by an encoder, and then the encoded result is decoded by a decoder to obtain keywords.

2) A decoder based on the generate mode and the copy mode is established, and a mode selection method based on reinforcement learning is designed to reduce the impact of OCR errors on the keyword generation. Moreover, the mode selection avoids mutual interference between the two modes during prediction;

3) A coding and decoding network model is established based on Transformer decoder network. The Transformer decoder network does not need to rely on the output of other word representations when calculating each word representation, which has better parallelism than the RNN;

4) In the keyword extraction model, local and global feature encoding is performed on all text lines of the keyword extraction model, in order to better obtain the text semantic representation;

5) In the encoder of the keyword extraction model, the capsule network is introduced to learn the structure (also may be referred to as the spatial structure information corresponding to the text lines) and topic information of the text input to help the model generate keywords for topic diversity.

The following specifically describes the technical solution of the disclosure and how the technical solution of the disclosure solves the above technical problems in specific embodiments. The following specific embodiments may be combined with each other, and the same or similar concepts or processes may not be repeated in some embodiments. The embodiments of the disclosure will be described below with reference to the drawings.

Figure 5:
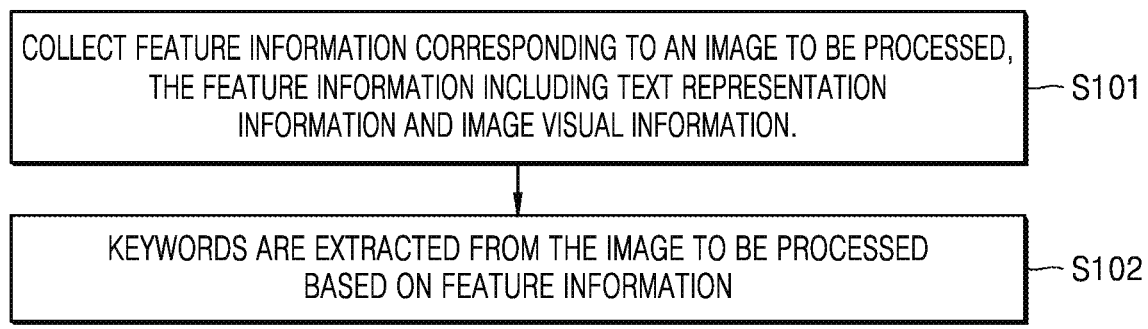
FIG. 5 is a schematic flowchart of a method for keyword extraction according to an embodiment of the disclosure.

FIG. 5 is a schematic flowchart of a method for keyword extraction according to an embodiment of the disclosure.

Referring to FIG. 5, an embodiment of the disclosure provides a method for keyword extraction. The method may be executed by an electronic device. The electronic device may be a terminal device or a server.

Operation S101: collect feature information corresponding to an image to be processed, the feature information including text representation information and image visual information.

For the embodiment of the disclosure, before operation S101, the method further includes: obtaining an image to be processed. In the embodiment of the disclosure, the obtained image to be processed may be one or more images. Further, the image to be processed in the embodiment of the disclosure may also be a video frame, which is not limited in the embodiment of the disclosure.

Further, each image to be processed may be an image containing text content or an image not containing text content. It is not limited in the embodiments of the disclosure.

The text representation information may include text content and text visual information corresponding to each text line in the image to be processed.

Further, the specific content of the feature information collected from the image to be processed is described in detail in the following embodiments, and is not described herein again.

Operation S102: keywords from the image to be processed based on the feature information are extracted.

For the embodiment of the disclosure, after the corresponding feature information is extracted from the image to be processed based on the above operation S101, the keywords are extracted from the image to be processed based on the feature information. Further, in the embodiment of the disclosure, the keywords extracted from the image to be processed are representative words or phrases that may summarize the image to be processed. In the embodiment of the disclosure, a method of extracting keywords from an image to be processed may be referred to as Keyword Extraction, also referred to as Keyphrase Extraction or HashTag extraction. The method of extracting the keywords from the image to be processed in the embodiment of the disclosure is not limited to the two methods mentioned above, and any method of extracting the keywords from the image to be processed is within the protection scope of the embodiment of the disclosure.

Further, in the embodiment of the disclosure, at least one keyword may be extracted from the image to be processed, or if an end character </s> is extracted at the first decoding time operation, it indicates that no keyword can be extracted from the image to be processed.

The embodiment of the disclosure provides a method for keyword extraction. Compared with the existing technology, feature information corresponding to an image to be processed is collected in the disclosure, and then the keywords are extracted from the image to be processed based on the feature information. That is, in the embodiment of the disclosure, the keywords may be extracted from the image to be processed, by using the feature information collected from the image to be processed.

Further, the feature information includes at least one of text representation information and image visual information; the text representation information includes at least one of text content and text visual information. Further, for example, the text visual information may be used for representing: font size, font color, font shape, word relative position, background color, and structure information and the like.

Further, in the embodiment of the disclosure, the image visual information may include: an image feature map; and the text visual information may include text visual information corresponding to each text line in the image to be processed.

Further, it can be known from the foregoing embodiments that the feature information may include image visual information. In the embodiment of the disclosure, the image visual information may include: an image feature map. Further, the feature information may contain only image visual information (image feature map), that is, keywords may be extracted from the image to be processed based on the image visual information (image feature map). In the embodiment of the disclosure, keywords may be extracted from the image to be processed based only on the image visual information (image feature map), that is, in the embodiment of the disclosure, the keywords may be extracted from an image that does not contain text information (text content) or an image containing a small amount of text information (text content), so that the probability that keywords may not be extracted from the image that does not contain text information (text content) or the image that contains a small amount of text information (text content) is reduced, thereby further improving the user experience.

Further, the image feature map is a convolution feature that represents the image. Therefore, the method of extracting the image visual information (image feature map) corresponding to the image to be processed from the image to be processed includes: inputting the image to be processed to a convolutional neural network for the convolution processing to obtain the image visual information (image feature map) corresponding to the image to be processed.

Further, extracting the image visual information (image feature map) corresponding to the image to be processed from the image to be processed specifically includes: performing image scaling processing on the image to be processed, and extracting image visual information (image feature map) from the scaled image. In the embodiment of the disclosure, if there is only one image to be processed, the image may be scaled, or the image may not be scaled. If there are at least two images to be processed, in general, the at least two images need to be scaled to make the scaled images have the same size to improve the processing speed when image feature information is collected from at least two images concurrently. Certainly, the at least two images may not be scaled.

Further, in the above embodiment, no matter whether the image to be processed is a single image or at least two images, the image scaling processing may be performed on each image. Specifically, if the image to be processed is scaled, the image to be processed may be scaled by direct stretching or zooming, or the image to be processed may be scaled by up-sampling or down-sampling. In the embodiment of the disclosure, if at least two images are scaled, each of the images may be scaled according to the above scaling processing method, such that the sizes of the images after the scaling processing are the same. In the embodiment of the disclosure, the scaling processing of the image to be processed is not limited to the foregoing scaling processing.

Figure 6:
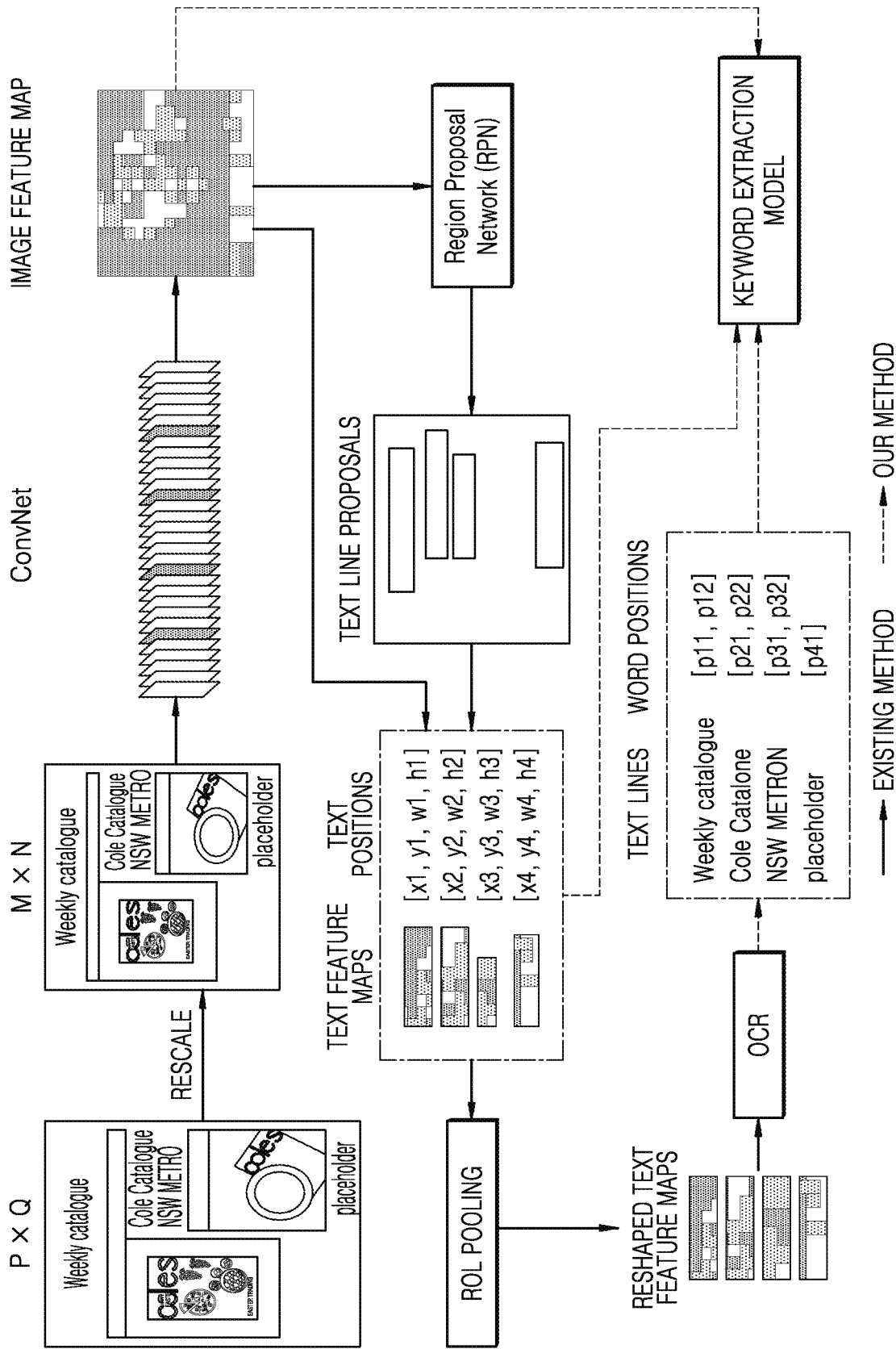
FIG. 6 is a schematic flowchart of a method for obtaining text and visual information based on OCR framework according to an embodiment of the disclosure.

FIG. 6 is a schematic flowchart of a method for obtaining text and visual information based on OCR framework according to an embodiment of the disclosure.

Referring to FIG. 6, for the specific example of the foregoing embodiment, the image to be processed (PXQ) is re-zoomed (scaled) to obtain a re-zoomed image (MXN), and the re-zoomed image (MXN) is passed to the convolutional network to obtain corresponding image visual information (also may be referred to as image feature map).

Specifically, the feature information in the foregoing embodiment may further include: text representation information. In the embodiment of the disclosure, the text representation information includes at least one of text content and text visual information.

Specifically, for one text line, the text content corresponding to the text line includes the word sequence of the text line.

Specifically, for one text line, the text visual information corresponding to the text line includes at least one of the following a text feature map corresponding to the text line; a text position of in the image to be processed; word positions in the image to be processed in the text line; and word relative positions in the text line in the text line.

Specifically, it can be known from the foregoing embodiments that the feature information corresponding to the image to be processed may include text representation information, and the text representation information may further include text visual information and text content. The text visual information may include: a text feature map corresponding to each text line, the text position corresponding to each text line in the image to be processed, and the word positions in the image to be processed in each text line. The following details describe how to determine text visual information and text content based on the image to be processed.

Specifically, a method of extracting a text feature map and text position corresponding to each text line in the image to be processed from the image to be processed includes: determining a proposal region of the text line based on the image visual information (image feature map) (the proposal region of the text line corresponding to each text line); determining the text feature map and the text position corresponding to each text line in the image to be processed from the image visual information (can represented by image feature map) through the text line proposal region. The text feature map in the embodiment of the disclosure is a text feature map corresponding to each text line in the text content.

Further, the method of determining a text line proposal region based on the image visual information (image feature map), and determining a text feature map and the text position corresponding to each text line in the image to be processed from the image visual information (image feature map) through the text line proposal region, may be specifically realized by the trained neural network. Specifically, as shown in FIG. 6, an image feature map of an image to be processed is input into a Region Proposal Network (RPN), a text line proposal region (a text line proposal region corresponding to each text line) is output, and then the RPN outputs the text line proposal region (a text line proposal region corresponding to each text line) and the image feature map obtained above to obtain the text feature map (the text feature map corresponding to the region of each text line) and the text position corresponding to each text line in the image to be processed. In the embodiment of the disclosure, the method of obtaining the text line proposal region from the image feature map of the image to be processed is not limited to use the foregoing RPN network, and any method of obtaining the text line proposal region from the image feature map of the image to be processed is within the protection scope of the embodiments of the disclosure.

Further, the working process of RPN is: using an anchor mechanism to generate k anchor boxes at each pixel position on the image feature map, and then classifying and regressing each anchor box to obtain the text feature map (text feature map corresponding to each text line) and text position corresponding to each text line in the image to be processed.

Further, the method of extracting the text content corresponding to each text line (word sequence corresponding to each text line), the word positions in the image to be processed, and the word relative positions in the corresponding text line from the image to be processed, includes: extracting the text content corresponding to each text line (word sequence corresponding to each text line) and the word positions in each text line based on the text feature map, wherein the word positions in the image to be processed and the word relative positions in the corresponding text line may be estimated according to the length of the word sequence of the text line and the position of the text line.

Further, in order to improve the collection speed of collecting the text content corresponding to each text line, the word positions in the image to be processed and the word relative positions in each corresponding text line based on the text feature map (text feature map corresponding to each text line), the text feature map (text feature map corresponding to each text line) may be scaled and the text feature map corresponding to each text line may be converted to have the same size before collection.

It should be noted that the text feature map (text feature map corresponding to each text line) may be scaled in any scaling way. For example, in the embodiment of the disclosure, a Region of Interest (RoI) pooling method is used to scale the text feature maps (text feature map corresponding to each text line); specifically, as shown in FIG. 6, all text feature maps (the text feature map corresponding to the region of each text line) are converted to have the same size, and then all the text lines are recognized based on all the RoI-ed text feature maps and by using the OCR tool, and the text content corresponding to each text line (the word sequence corresponding to each text line) and the word relative positions in each text line are obtained.

In the above embodiment, after obtaining at least one of the image visual information (image feature map) and the text representation information (text feature map corresponding to each text line, the text position corresponding to each text line in the image to be processed, the text content information corresponding to each text line, the word positions in the image to be processed and the word relative positions in each text line), the keywords are extracted from the image to be processed based on these obtained pieces of information. In other words, in the embodiment of the disclosure, if the image visual information is necessary for extracting the keywords from the image to be processed, then after the image visual information of the image to be processed, the keywords are extracted from the image to be processed based on the image visual information; if the text representation information is necessary for extracting keywords from the image to be processed, then after the text representation information of the image to be processed, the keywords are extracted from the image to be processed based on the text representation information; if the text representation information and the image visual information are necessary for extracting the keywords from the image to be processed, then after the text representation information and the image visual information of the image to be processed, the keywords are extracted from the image to be processed based on the text representation information and the image visual information.

Specifically, according to another possible implementation manner of the embodiment of the disclosure, extracting keywords from an image to be processed based on feature information includes: encoding the feature information to obtain an encoded result of the feature information; and extracting keywords from the image to be processed based on the encoded result.

Further, the method of extracting the keywords from the image to be processed based on the above obtained feature information (at least one of an image feature map, a text feature map corresponding to each text line, a text position corresponding to each text line in the image to be processed, a word sequence corresponding to each text line, and word positions in the image to be processed and word relative positions in the corresponding text line) may be implemented by a neural network or not. Wherein, one specific example of a method of extracting the keyword from the image to be processed by a neural network is shown in FIG. 6, where the feature information (an image feature map, a text feature map corresponding to each text line, a text position corresponding to each text line in the image to be processed, and the word sequence corresponding to each text line, and word positions in the image to be processed and word relative positions in each corresponding text line) is passed to the keyword extraction model to obtain a keyword sequence, such that the keyword extraction in the image to be processed is realized.

Specifically, if the feature information includes image visual information, the feature information is encoded to obtain an encoded result of the feature information; and based on the encoded result, extracting keywords from an image to be processed includes: encoding the image visual information to obtain an image feature representation; extracting keywords from the image to be processed based on the image feature representation. If the feature information includes text representation information, the feature information is encoded to obtain the encoded result of the feature information; extracting keywords from an image to be processed based on the encoded result includes: encoding the text representation information to obtain the encoded result of text representation information, and extracting keywords from the image to be processed based on the encoded result of text representation information. If the feature information includes image visual information and text representation information, the feature information is encoded to obtain the encoded result of the feature information; extracting keywords from an image to be processed based on the encoded result includes: encoding the image visual information and the text representation information to obtain the image feature representation and the encoded result corresponding to the text representation information; extracting keywords from the image to be processed based on the image feature representation and the encoded result corresponding to the text representation information. In the embodiment of the disclosure, the text representation information referred to here is still at least one of text content and text visual information. The text visual information includes at least one of a text feature map corresponding to each text line, the text position corresponding to each text line in the image to be processed, word positions in the image to be processed and word relative positions in each corresponding text line; and the text content includes text content information corresponding to each text line.

For the embodiment of the disclosure, the model related to extracting keywords sequence from an image to be processed is a keyword extraction model, which may include an encoder and a decoder. In other words, in the embodiment of the disclosure, the feature information is encoded (at least one of the image visual information and the text representation information) by using the encoder to obtain a corresponding encoded result, and then the corresponding encoded result is decoded by using the decoder to predict the keywords in order to extract the keywords from the image to be processed. In the embodiment of the disclosure, the image visual information (image feature map) and text representation information (at least one of the text feature map corresponding to each text line, the text position corresponding to each text line in the image to be processed, the word sequence corresponding to each text line, word positions in the image to be processed, and the word relative positions in the each corresponding text line) are encoded to obtain the encoded result, wherein the obtained encoded result may be referred as a hidden layer representation, therefore the corresponding encoded result (that is the above hidden layer representation) is decoded for keyword prediction.

Wherein, in the embodiment of the disclosure, the method of encoding the image visual information and the text representation information (at least one of the text feature map corresponding to each text line, the text position corresponding to each text line in the image to be processed, word sequence corresponding to each text line, word positions in the image to be processed, and the word relative positions in each corresponding text line) may employ the existing encoding method, or the encoding method introduced in the embodiment of the disclosure. Based on the same reason, the method of decoding the encoded hidden layer representation may employ the decoding method in the existing technology or may employ the decoding method introduced in the embodiment of the disclosure.

Wherein, in the embodiment of the disclosure, the method of encoding the image visual information and the text representation information (at least one of the text feature map corresponding to each text line, the text position corresponding to each text line in the image to be processed, the word sequence corresponding to each text line and the word positions in the image to be processed, and the word relative positions in the each corresponding text line) is described in the following embodiments.

Specifically, the feature information includes text representation information and image visual information, wherein the text representation information includes at least one of text visual information and text content; the encoded result includes text context representation, image feature representation, and at least one of structure information and topic information representations of all text lines. Wherein, the text context representation is obtained based on the text representation information, the image feature representation is obtained based on the image visual information, and the structure information and the topic information representations of all text lines are obtained based on the text context representation.

Further, if the feature information includes text representation information (the text representation information includes at least one of text visual information and text content), the encoding the feature information to obtain an encoded result of the feature information includes: encoding the text representation information (the text representation information includes at least one of text visual information and text content) to obtain a text context representation and at least one of text line structure information representation and topic information representation.

Figure 7:
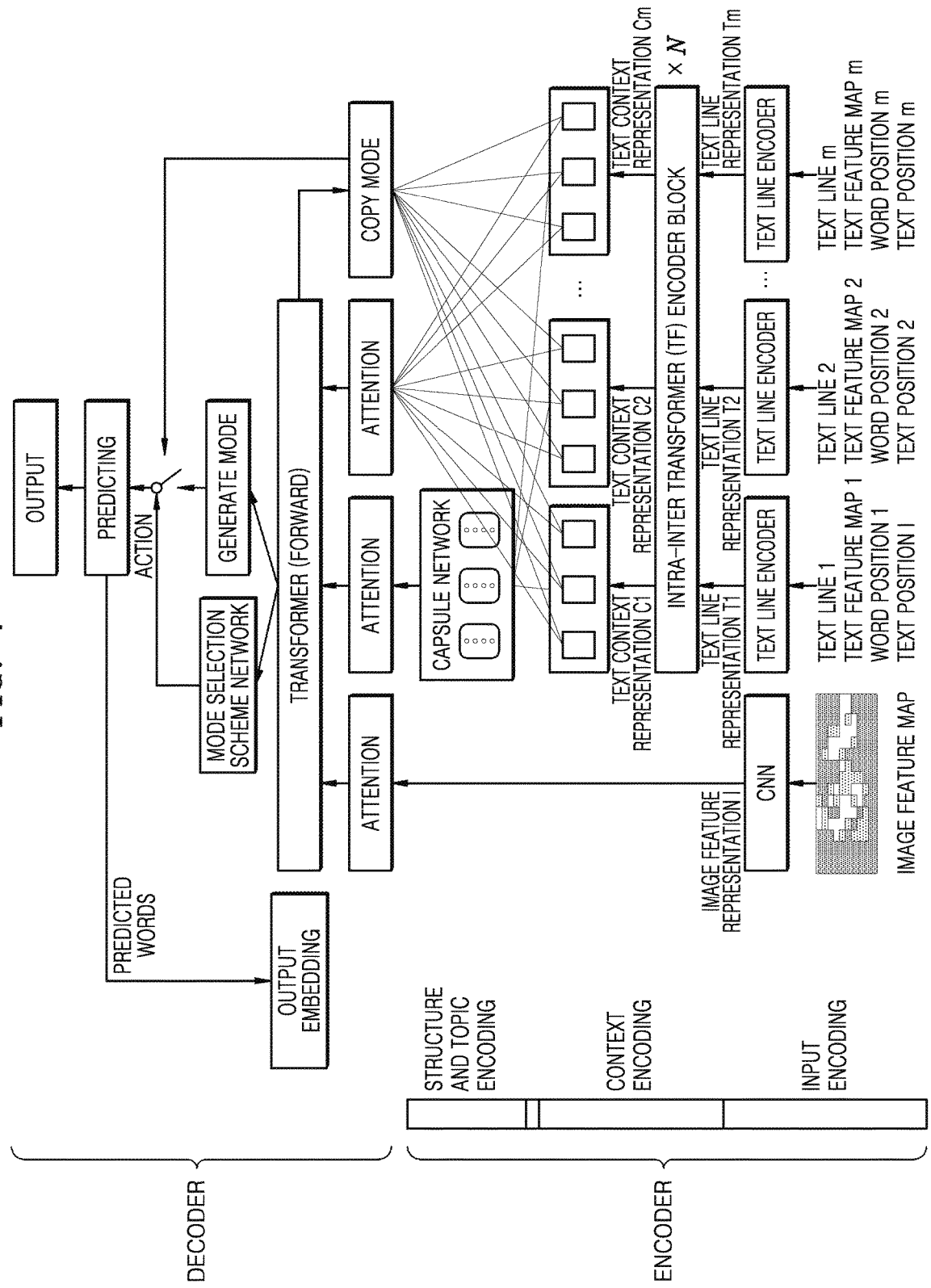
FIG. 7 is a schematic diagram of a specific framework of another method for keyword extraction according to an embodiment of the disclosure.

Further, if the feature information includes image visual information, the image visual information is encoded to obtain the image feature representation; that is, the image feature map corresponding to the image to be processed is encoded to obtain the corresponding image feature representation, and the specific method of encoding the image feature map corresponding to the image to be processed is to perform a convolution processing on the image feature map corresponding to the image to be processed though CNN to obtain the image feature representation. For example, as shown in FIG. 7, in the encoder, the image feature map is convolved by CNN to obtain the image feature representation I.

Specifically, the text representation information corresponding to each text line (at least one of the text feature map corresponding to each text line, the text position corresponding to each text line in the image to be processed, the word sequence corresponding to each text line, the word positions in the image to be processed and the word relative positions in each corresponding text line) is encoded to obtain the text line representation corresponding to each text line, the text context representation corresponding to each text line, and at least one of the structure information representation and the topic information representation corresponding to the text lines.

In another possible implementation method of the embodiment of the disclosure, the encoding text representation information to obtain the text line representation corresponding to each text line, the text context representation corresponding to each text line, and at least one of the structure information representation and the topic information representation corresponding to the text line, includes: encoding text representation information to obtain a text line representation corresponding to each text line; encoding a text line representation corresponding to each text line to obtain a text context representation corresponding to each text line, wherein the text context representation corresponding to a text line includes a local text context representation and a global text context representation corresponding to each text line; and encoding the representation corresponding to each text line to obtain at least one of the structure information representations and the topic information representations corresponding to all text lines.

It can be known from the foregoing embodiments during encoding the text representation information corresponding to each text line (the text representation information corresponding to each text line includes: text content and text visual information, wherein the text visual information includes the text feature information corresponding to each text line, the text position corresponding to each text line in the image to be processed, the word positions in the image to be processed, and the word relative positions in the text line), the text line representation corresponding to each text line is obtained first, the text context representation corresponding to the text line is obtained based on the text line representation corresponding to each text line, and then at least one of the structure information representations and the topic information representations corresponding to all text lines is obtained based on the text context representation corresponding to the text line.

It can be known from the foregoing embodiment that the text representation information corresponding to each text line (the text feature map corresponding to each text line, the text position corresponding to each text line in the image to be processed, and the word sequence corresponding to each text line and the word positions in the corresponding text line) is encoded to obtain the text line representation corresponding to each text line, the text line representation corresponding to each text line is encoded to obtain the text context representation corresponding to each text line, and then at least one of the structure information representation and the topic information representation corresponding to the text line obtained by encoding based on the text context representation corresponding to each text line. For example, the structure information may be spatial tree structure information and triangular structure information formed by text lines. In the embodiment of the disclosure, the structure information representation is used to represent spatial tree structure information, triangle structure information, and the like formed by text lines.

FIG. 7 is a schematic diagram of a specific framework of another method for keyword extraction according to an embodiment of the disclosure.

Referring to FIG. 7, the text representation information corresponding to each text line is encoded to obtain the text line representation corresponding to each text line through a text line encoder. For example, the text feature information corresponding to a text line 1 (may be referred to as a text feature map 1), the text content information corresponding to the text line 1 (may be referred to as a text content 1), the text position corresponding to a text line 1 in the image to be processed (may be referred to as a text position 1), and the word positions in the text line 1 (may also be referred to as word positions 1) are encoded by the text line encoder to obtain the text line representation T1, and the text feature information corresponding to a text line 2 (may be referred to as a text feature map 1), the text content information corresponding to the text line 2 (may be referred to as a text content 2), the text position corresponding to the text line 2 in the image to be processed (may be referred to as a text position 2) and the word positions in the text line 2 (may be referred to as word positions 2) are encoded by the text line encoder to obtain the text line representation T2, . . . , and the text feature information corresponding to a text line m (may be referred to the text feature map m), the text content information corresponding to the text line m (may be referred to as s text content m), the position corresponding to the text line m in the image to be processed (may be referred to as a text position m) and the word positions in the text line m (may be referred to as word positions m) are encoded by the text line encoder to obtain a text line representation Tm; and then the text line representation T1, the text line representation T2, . . . , the text line representation Tm is processed by N Intra-Inter Transformer Encoder Blocks to obtain the text context representation C of the corresponding text line (that is, the text context representation C1, the text context representation C2, . . . , the text context representation Cm), wherein C=[C1, C2, . . . , Cm]; further, the obtained text context representation of the text line is processed by the capsule network to encode the spatial tree structure and the topic information of the text line to obtain the corresponding spatial tree structure information representation and the topic information representation corresponding to all the text lines.

In the above embodiment, the method of obtaining the text line representation corresponding to each text line, the text context representation corresponding to each text line, and the structure information representations and topic information representations corresponding to all text lines are introduced. The following will introduce the specific implementations of obtaining the text line representation, the text context representation and the text line structure information and the topic information representations, and see the following embodiments for details.

In a possible implementation method in the embodiment of the disclosure, if the feature information includes image visual information and text representation information, the encoding the feature information to obtain an encoded result of the feature information, includes a text context representation, at least one of text line structure information and topic information representations, and image feature representation.

Specifically, if the feature information includes text representation information, and the text representation information includes at least one of text visual information and text content, the encoding the feature information to obtain an encoded result corresponding to the feature information, includes at least one of the following: encoding the text representation information to obtain the text line representation; and encoding the text line representation to obtain the text context representation; encoding the text context representation to obtain the text line structure information and the topic information representations.

In another possible implementation method of the embodiment of the disclosure, if the feature information includes text representation information and the text representation information includes text content, which includes a word sequence corresponding to each text line, for one text line, the text content of the text line includes the word sequence corresponding to the text line.

Wherein, for one text line, encoding the text content to obtain a text line representation includes: encoding the word sequence corresponding to the text line to obtain character-based word representations; determining the text line representation corresponding to the text line based on the character-based word representations.

Specifically, determining the feature representation corresponding to each word in each text line based on the text feature information corresponding to each text line, the text position corresponding to each text line in the image to be processed, the word sequence corresponding to each text line and the word positions in the corresponding text line, may specifically include: applying the CNN to the character embedding sequence of each word in the text line to obtain the character-based word representation; splitting the text feature map into word feature maps based on the word positions and rescaling the word feature maps such that the scaled word feature maps have the same size, and applying the CNN to the scaled feature maps to obtain the feature map representation; determining word position vector corresponding to each text line based on the word positions in the corresponding text line; and determining a text position representation corresponding to each text line based on the corresponding text position of each text line in the image to be processed. In the embodiment of the disclosure, the method of obtaining a character-based word representation based on the word sequence corresponding to each text line, and the method of obtaining a position vector corresponding to each text line in the image to be processed based on the text position corresponding to each text line in the image to be processed, and the method of obtaining the feature map representation corresponding to each text line based on the text feature information corresponding to each text line, and the method of determining the position vector of each word in the corresponding text line based on the word positions in the image to be processed and the word relative positions in the corresponding text line may be performed simultaneously, or may not be performed simultaneously, or may be partially performed simultaneously, which is not limited in the embodiment of the disclosure.

Further, in the embodiment of the disclosure, obtaining the text line representation corresponding to each text line based on the obtained representation information, which may specifically include: concatenating the character-based word representation, the text feature corresponding to each word, the word relative positions in the corresponding text line and the text position of each text line in the image to be processed, and adding the position encoding in the text line for each word in the text line after the concatenating (for example, sinusoidal position encoding), for adding the word positions in the text line to obtain the text line representation corresponding to each text line. In the embodiment of the disclosure, the obtained position vector is copied after obtaining the text position corresponding to each text line in the image to be processed, and the copied text position corresponding to each text line in the image to be processed and the character-based word representation, the feature map representation corresponding to each word, the word positions in the image to be processed, and the word relative positions in the corresponding text line are concatenated and the sinusoidal position encoding is added for each word in the text line after the concatenating processing for adding the word positions in the text line to obtain the text line representation corresponding to each text line. In the embodiment of the disclosure, after copying the obtained position vector after the text position corresponding to each text line in the image to be processed, the number of the obtained position vectors is the same as the number of words in each text line, to add each word in the text line into the text line position.

Specifically, the sinusoidal position encoding: for the word position encoding vector $PE_p \in R^d$ at position p, the values in different dimensions are calculated using the sine and cosine functions of different frequencies:

$$PE_{(p,2i)} = \sin(p/10000^{2i/d})$$

$$PE_{(p,2i+1)} = \cos(p/10000^{2i/d})$$

Wherein, p represents the position of the word in the text line, i represents the dimension index, and d represents the dimension of the encoding vector.

Figure 8:
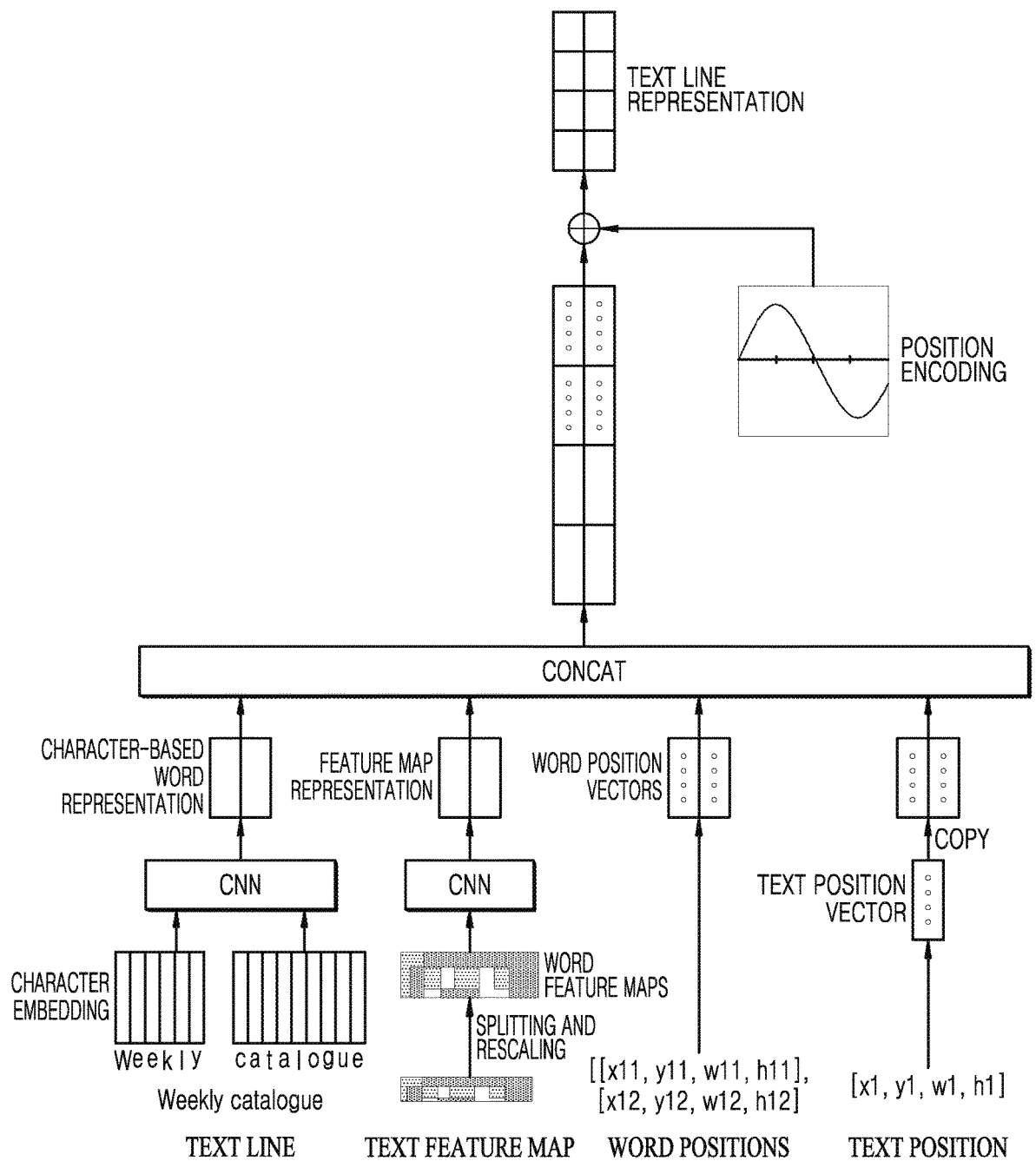
FIG. 8 is a schematic diagram of obtaining a text line representation according to an embodiment of the disclosure.

FIG. 8 is a schematic diagram of obtaining a text line representation according to an embodiment of the disclosure.

Referring to FIG. 8, specifically, an example of an method of obtaining a text line representation corresponding to each text line based on the text feature map corresponding to each text line, the text position corresponding to each text line in the image to be processed, a word sequence corresponding to each text line, the word positions in the image to be processed and the word relative position in the corresponding text line is shown in FIG. 8, which includes: the word sequence corresponding to text line 1 is processed by the character embedding, and the character-embedding is input into the CNN to obtain the character-based word representation for each word in the text line; and the text feature map of text line 1 is divided into word feature maps, and the respective word feature maps are scaled to obtain the respective word feature maps with the same size, and then the word feature maps with the same size after scaling processing are processed by CNN to obtain the feature map representation corresponding to text line 1; and the corresponding word position vector is obtained based on each word position corresponding to each word in the text line 1, for example, $[x_{11}, y_{11}, w_{11}, h_{11}]$ and $[x_{12}, y_{12}, w_{12}, h_{12}]$ (wherein, (x, y), w, h represent the central point position, width, and height of the word respectively); the corresponding text position representation is obtained based on the position $[x_1, y_1, w_1, h_1]$ corresponding to the text line 1 in the image to be processed, wherein $(x_1, y_1)$, $w_1$, $h_1$ represent the central point position, width and height of the text line 1 respectively, and the obtained text position representation is copied, such that the number of the obtained text position representations is the same as the number of words in the text line 1, such that subsequently the text position representation is added into each word in the text line 1; and then character-based word representation corresponding to the text line 1, the feature map representation corresponding to text line 1, word position vectors corresponding to text line 1 and the copied text position vectors corresponding to text line 1 are concatenated, and then the sinusoidal position encoding is performed on the concatenated vectors to obtain text line representation corresponding to text line 1. Wherein, the method of obtaining the text line representation for the text line is the same as the method of obtaining the text line representation corresponding to text line 1 for text line 1, and will not be repeated in the embodiment of the disclosure.

Further, in the embodiment of the disclosure, the word embeddings are replaced with a character-based word representations for the word sequence corresponding to each text line. Since each word vector in the embodiment of the disclosure is obtained based on the character-based learning instead of directly using word embedding for each word. Furthermore, the size of all character embedding vectors is much smaller than all the word embedding vectors. The former embedding matrix (that is, the size of character embedding vectors) is a matrix of |C|*d. The latter word embedding matrix is a matrix of |V|*d. Where |C| is the size of all characters, |V| is the size of the word dictionary, d is the dimension of word (character) embedding, and here |C|<<|V|. Therefore, in the embodiment of the disclosure, the word embeddings being replaced with the character-based word representations may reduce the storage space and memory of the text line encoder.

In another possible implementation method of the embodiment of the disclosure, the text line representation includes the text line representations corresponding to at least one text line, wherein encoding the text line representation to obtain a text context representation includes: encoding each text line representation to obtain a local text context representation corresponding to each text line; encoding all text line representations as a whole to obtain global text context representations corresponding to all text lines; determining the text context representation corresponding to each text line based on the local text context representation corresponding to each text line and the global text context representations corresponding to all text lines.

In the above embodiment, the method of obtaining the text line representation corresponding to each text line is introduced. After obtaining the text line representation corresponding to each text line, the specific implementation of encoding the text line representation corresponding to each text line to obtain the text context representation corresponding to each text line is described in the following embodiments.

In another possible implementation method of the embodiment of the disclosure, the encoding the text line representation corresponding to each text line to obtain the text context representation corresponding to each text line includes: encoding the text line representation corresponding to each text line to obtain local text context representation corresponding to each text line; encoding all text lines simultaneously to obtain the global text context representations corresponding to all text lines; and determining the text context representation corresponding to each text line based on the local text context representation corresponding to each text line and the global text context representations corresponding to all text lines.

Specifically, the text context representation corresponding to each text line is obtained by encoding the text line representation corresponding to each text line, which may be specifically processed by the context encoding module in the encoder. In the embodiment of the disclosure, a text context representation module (may also be referred to as a context encoding module), that is, an Intra-Inter Transformer Encoder Block, is designed to perform local context encoding and the global context encoding on the text line representation corresponding to each input text line.

Figure 9:
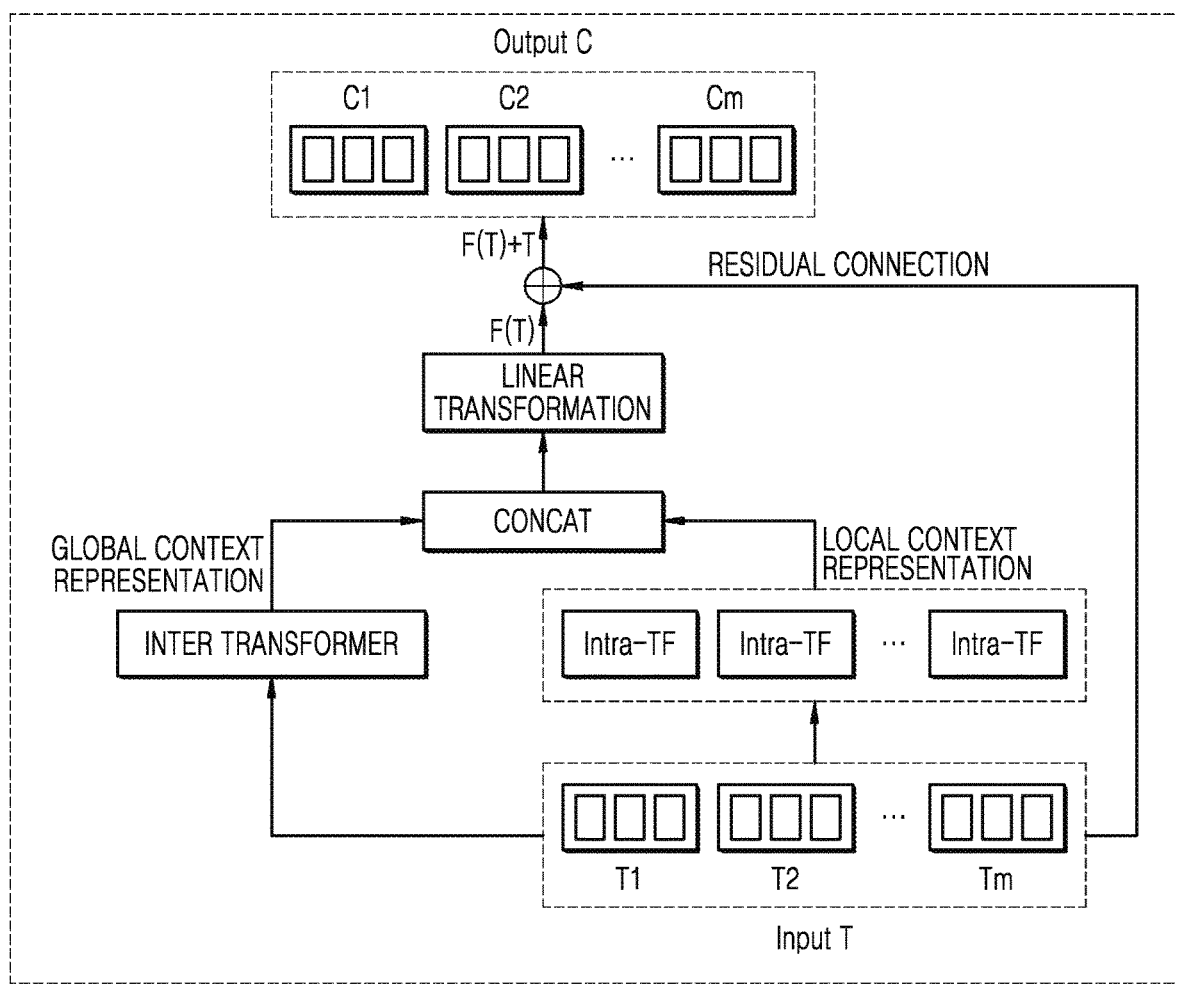
FIG. 9 is a schematic diagram of obtaining a text context representation according to an embodiment of the disclosure.

FIG. 9 is a schematic diagram of obtaining a text context representation according to an embodiment of the disclosure.

Referring to FIG. 9, specifically, in the embodiment of the disclosure, the method of encoding the text line representation corresponding to each text line to obtain the text context representation corresponding to the text line is shown, and the specific processing method is shown as follows:

1) The input information T=[T1, T2, . . . , Tm] is given, wherein T represents the text line representation corresponding to each text line in the image to be processed, T1 represents the text line representation corresponding to text line 1 and T2 represents the text line representation corresponding to the text line 2, and Tm represents the text line representation corresponding to text line m;
2) Through the intra Transformer (TF) encoder block, (i.e., Intra TF), each text line representation is encoded, and the local text context representation L corresponding to each text line is obtained;
3) Through the text inter Transformer encoder block, (i.e., Inter TF), all text lines are encoded simultaneously to obtain the global text context representation G;
4) The outputs of the Intra-TF and Inter-TF concatenated, that is, the local text context representation corresponding to each text line and the obtained global text context representation are concatenated. Specifically, the local text context representation L=[L1, L2, . . . , Lm] corresponding to all text lines and the obtained global text context representation G are concatenated in columns. Here Li represents the local text context representation obtained by the $i^{th}$ Intra-TF; and, in the operation 4), in addition to concatenating by column, the Intra-TF and Inter-TF may be merged by summing, that is, L+G.
5) The concatenated information (or the summed information) T is input to the linear projection layer to be subjected a linear transformation to obtain F(T), which has the same dimension as the input T;
6) The final output result C=[C1, C2, . . . , Cm] may be obtained by performing the residual connection (that is, C=F(T)+T) on the F(T) and the text line representations corresponding to all text lines, that is, the text context representation of the text lines is obtained, wherein C represents the text context representation of the text lines, C1 represents the text context representation of text line 1, and C2 represents text context representation of text line 2, and Cm represents text context representation of text line m.

Figure 16:
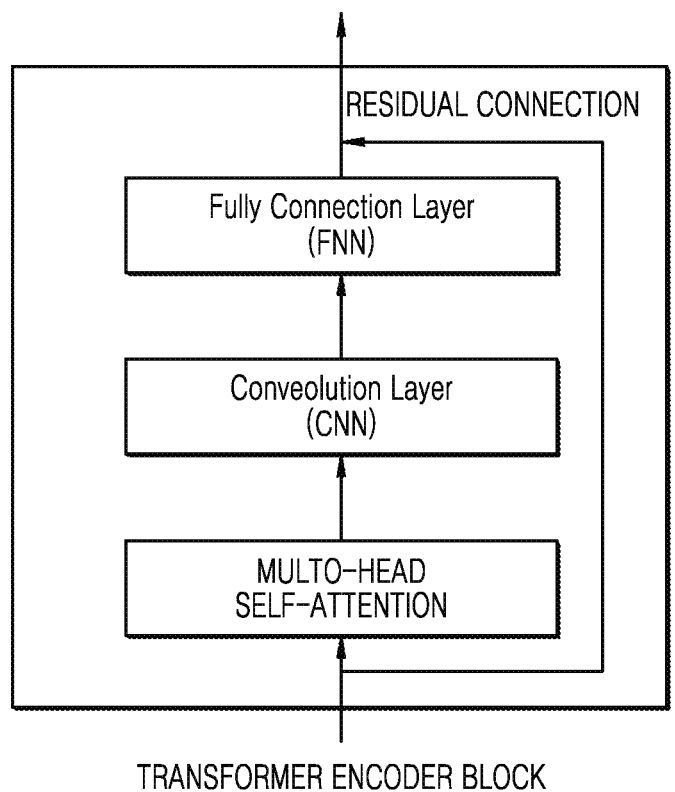
FIG. 16 is a schematic diagram of a Transformer Encoder Block according to an embodiment of the disclosure.

FIG. 16 is a schematic diagram of a Transformer Encoder Block according to an embodiment of the disclosure.

Referring to FIG. 16, in the above embodiment, the local text context representation and the global context representation are all obtained by using the Transformer encoder block. Wherein, the Transformer encoder block is mainly composed of the following three sub-components, including: a Multi-head Self-Attention, a convolutional layer, and a fully-connected layer. The specific processing process is: performing attention processing on the input information by the Multi-head Self-Attention; convoluting the processed information by the convolutional layer; further performing the linear transformation processing on the convoluted information by the fully-connected layer; and the linear transformation processing result and the above input information being subjected to the residual connection to be used as the output of the module. In the embodiment of the disclosure, the input information for Intra-TF and Inter-TF are both input information T=[T1, T2, . . . , Tm], and the output of Intra-TF and Inter-TF are the local text context representations L and the global text context representations G.

Further, in the embodiment of the disclosure, the local text context representation and global text context representation of all text lines are obtained through the Intra-Inter Transformer Encoder Block, and the context information may be reflected from the text context representation, such that when predicting keywords through the local text context representation and the global text context representation corresponding to all the text lines, the keywords may be predicted more accurately.

In another possible implementation method of the embodiment of the disclosure, the text context representation includes a text context representation corresponding to each text line; the encoding the text context representation to obtain at least one of text line structure information representation and topic information representation includes: encoding the text context representation corresponding to each text line to obtain the hidden representation corresponding to each text line; and determining at least one of the text line structure information representation and the topic information representation based on the hidden representation corresponding to each text line.

After the text context representation corresponding to each text line is obtained as described above, the structure and the topic information of the text context representation corresponding to each text line is encoded to obtain the structure and the topic information representation corresponding to all the text lines.

In another possible implementation method of the embodiment of the disclosure, the encoding the text context representation to obtain at least one of text line structure and topic information representation may specifically include: encoding through at least one capsule network on the text context representation corresponding to each text line to obtain some corresponding capsule vectors.

For the embodiment of the disclosure, a capsule is a group of neurons, and its activation vector represents the instantiation parameters of a specific type of entity (such as a target or a part of a target). The capsule network is different from a conventional convolutional neural network in that: it converts the scalar output of the neuron of convolution to vector output to express richer feature information, such as relative position, text semantic information and the like; when there is a given group of input vectors, it learns multiple sets of weights through a dynamic routing algorithm, and weighted sums the input vectors to obtain a set of capsule vectors, where the norm of each capsule vector represents the possibility that a certain object and component exists in the input, and the value of the vector reflects the relative structure information and the cluster information between the input vectors. In the embodiment of the disclosure, the capsule vectors are used to represent the text line structure information and the topic information corresponding to all the text lines. The text line structure information corresponding to all the text lines in the embodiment of the disclosure may include layout information of the text, such as the spatial tree structure information and the triangular structure information, and the like formed by all the text lines; and the topic information refers to the topics descripted in the text content.

Wherein, the capsule network encodes these pieces of information into some capsule vectors, which are used to represent the structure and topic information representations corresponding to all text lines.

Further, in the embodiment of the disclosure, if it is merely for the purpose of obtaining the keywords for topic diversity, the topic information representation may be learned through a capsule network, or an approximate replacement of topic vector may be learned through a topic model (for example, Latent Semantic Analysis (LSA), Latent Dirichlet Allocation (LDA)).

Figure 10:
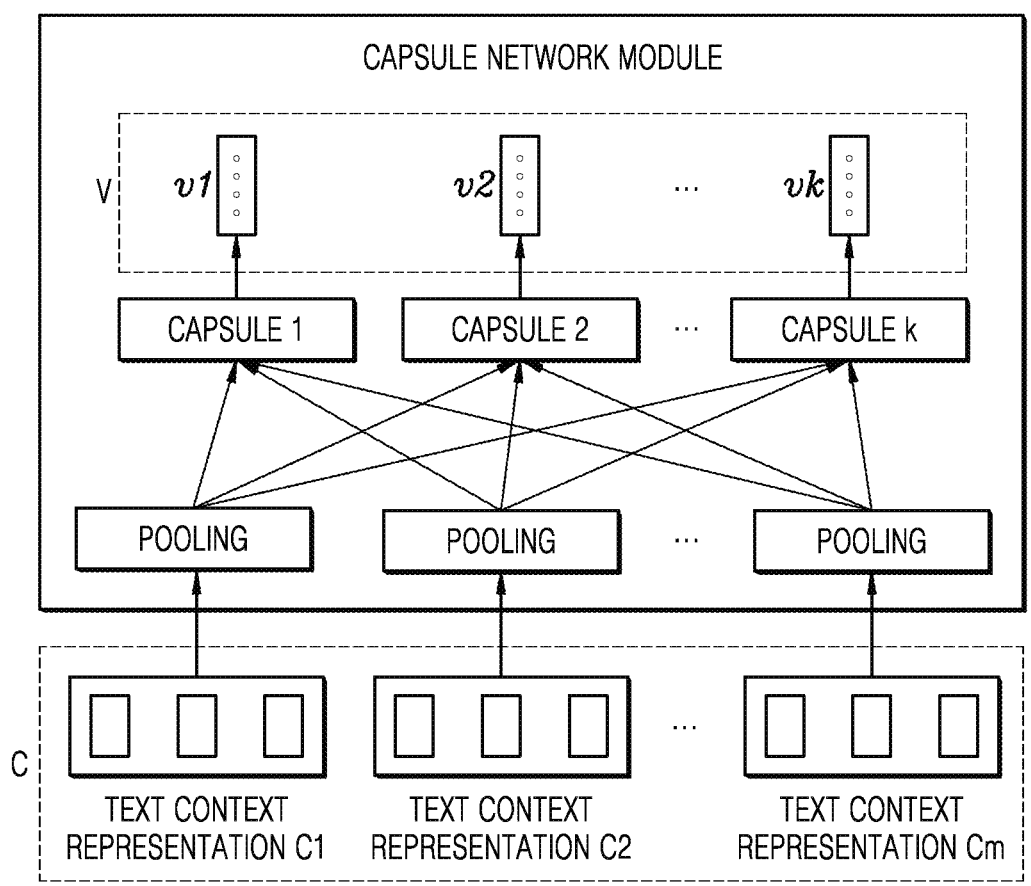
FIG. 10 is a schematic diagram of obtaining text structure information and topic information representations according to an embodiment of the disclosure.

FIG. 10 is a schematic diagram of obtaining text structure information and topic information representations according to an embodiment of the disclosure.

Referring to FIG. 10, further, the text context representation (C=[C1, C2, ..., Cm]) corresponding to each text line is encoded to obtain at least one of the structure and topic information representation corresponding to all text lines, including:
1) Inputting text context representation C=[C1, ..., Cm], wherein Ci represents the text context representation of the $i^{th}$ text line;
2) Pooling each text context representation Ci to obtain the hidden vector hi;
3) Applying the dynamic routing algorithm of capsule network to all hidden vectors [h1, ..., hm] to obtain k capsule vectors (including: capsule 1, capsule 2, ..., capsule k), that is, V=[v1, ..., vk]=Capsules ([h1, ..., hm]);
4) Outputting capsule representation (all the capsule vectors) V (v1, v2, ..., vk).

It should be noted that the capsule representation V output in the foregoing embodiment is used to represent the text line structure information and the topic information corresponding to all the text lines.

Further, the structure information and topic information of all text lines in the image are encoded through a capsule network, wherein the structure information helps the model to focus on the important spatial position in the image of the text line, and the topic information helps the model's decoder to generate keywords having topic diversity, which may improve the accuracy of collecting text lines from the image to be processed.

Another possible implementation of the structure and topic encoding module of the embodiment of the disclosure is to directly apply a capsule network on the text context representation C to obtain k capsule vectors (including: capsule 1, capsule 2, ..., capsule k).

It can be known from the above embodiments that the image feature representation I corresponding to the image to be processed, the text context representation C of the text lines, and the capsule representation V are obtained by the encoder, such that the image feature representation I, the text context representation C of the text lines, and the capsule representation V is decoded to obtain a keyword sequence. In the embodiment of the disclosure, during the decoding process, specifically, all keywords are predicted by generating a word sequence, for example, [<s>, Beauty, <s>, MYER, <s>, Sand, &, Sky, </s>]; wherein "Beauty," "MYER" and "Sand & Sky" are keywords, and <s> and </s> represent the start position of the keyword and the end of the keyword sequence, respectively. In the embodiment of the disclosure, the image feature representation I is used to represent the image feature of the image to be processed, the text context representation C of the text line considers the context information of each word to obtain feature representation output when encoding each word in the input sequence, and the capsule representation V is used to represent text structure information and topic information. The input information has topic information, which helps to generate keywords for topic diversity, such that the extracted keywords will not focus on a single topic. The spatial structure information is the relative position between text lines, the position of words and text lines in images, and the addition of spatial structure information helps the model to focus on words in important positions, for example, a word in the top-middle position of the image, or a word which is surrounded by other words, is often more important. Because the above functions of the image feature representation I, the text context representation C of the text lines, and the capsule representation V, the keyword prediction performed through the image feature representation I, the text context representation C of the text lines and the capsule representation V may improve the accuracy of the predicted keywords.

In another possible implementation method of the embodiment of the disclosure, the extracting keywords from an image to be processed based on an encoded result, includes: determining, based on the encoded result, a target prediction mode corresponding to each decoding time operation, and a prediction word corresponding to the target prediction mode; outputting the prediction word corresponding to each decoding time operation; and obtaining keywords based on the prediction word sequence of all decoding time operations.

For the embodiment of the disclosure, the encoded result may include image feature representation, text context representation, and at least one of structure information and topic information representations of text lines. The extracting keywords from the image to be processed based on the encoded result, includes: extracting keywords from the image to be processed based on the image feature representation, the text context representation, at least one of the structure information and the topic information representations of text lines.

For the embodiment of the disclosure, when predicting the keywords based on the encoded result corresponding to the image to be processed (image feature representation I, text line feature representation C of the text lines, and the capsule representation V), the prediction is performed on each prediction word at each decoding time operation to predict on the above keywords, thereby obtaining the keywords. In the embodiment of the disclosure, one prediction word is predicted at one decoding time operation, and at least one prediction word corresponds to one keyword. For example, for the keyword sequence [<s>, Beauty, <s>, MYER, <s>, Sand, &, Sky, </s>], the predicted word corresponding to the first decoding time operation is "<s>," the prediction word corresponding to the second decoding time operation is "Beauty," the prediction word corresponding to the third decoding time operation is "<s>," the prediction word corresponding to the fourth decoding time operation is "MYER," the prediction word corresponding to the fifth decoding time operation is "<s>," the prediction word corresponding to the sixth decoding time operation is "Sand," the prediction word corresponding to the seventh decoding time operation is "&," the prediction word corresponding to eighth time operation is "Sky," and the prediction word corresponding to the ninth decoding time operation is "</s>." Wherein, three keywords "Beauty," "MYER" and "Sand & Sky" are obtained with respect to the prediction words corresponding to the foregoing decoding time operations.

Specifically, for one decoding time operation, based on the encoded result, determining the target prediction mode corresponding to the decoding time operation and the prediction word corresponding to the target prediction mode include: Operation Sa (not shown in the figure) and Operation Sb (not shown in the figure):

Operation Sa: Based on the encoded result, determining the prediction word of the preconfigured prediction mode corresponding to the decoding time operation and the target prediction mode corresponding to the decoding time operation, and obtaining the prediction word corresponding to the target pre-stored mode based on the prediction word of each prediction mode and the target prediction mode corresponding to the decoding time operation; and Operation Sb: based on the encoded result, determining a target prediction mode corresponding to the decoding time operation from the pre-configured prediction modes, and obtaining a prediction word corresponding to the target prediction mode based on the encoded result.

Specifically, the pre-configured prediction mode includes: a first prediction mode in which keyword prediction is performed based on a common word dictionary; and a second prediction mode in which word prediction is performed based on all words in input text lines, wherein, while performing the word prediction based on the second prediction mode, each word contained in the text line is obtained based on the encoded result of the image feature information, wherein the image feature information includes the text content of the image to be processed.

Specifically, in the embodiment of the disclosure, the dictionary on which the first prediction mode performs word prediction may include a predefined word dictionary. Specifically, the first prediction mode may also be referred to as a generate mode, that is, a prediction mode in which word prediction is performed based on a predefined dictionary; the second prediction mode may also be referred to as a copy mode, that is, a prediction mode in which the word prediction is performed based on all words in input text lines.

Figure 11:
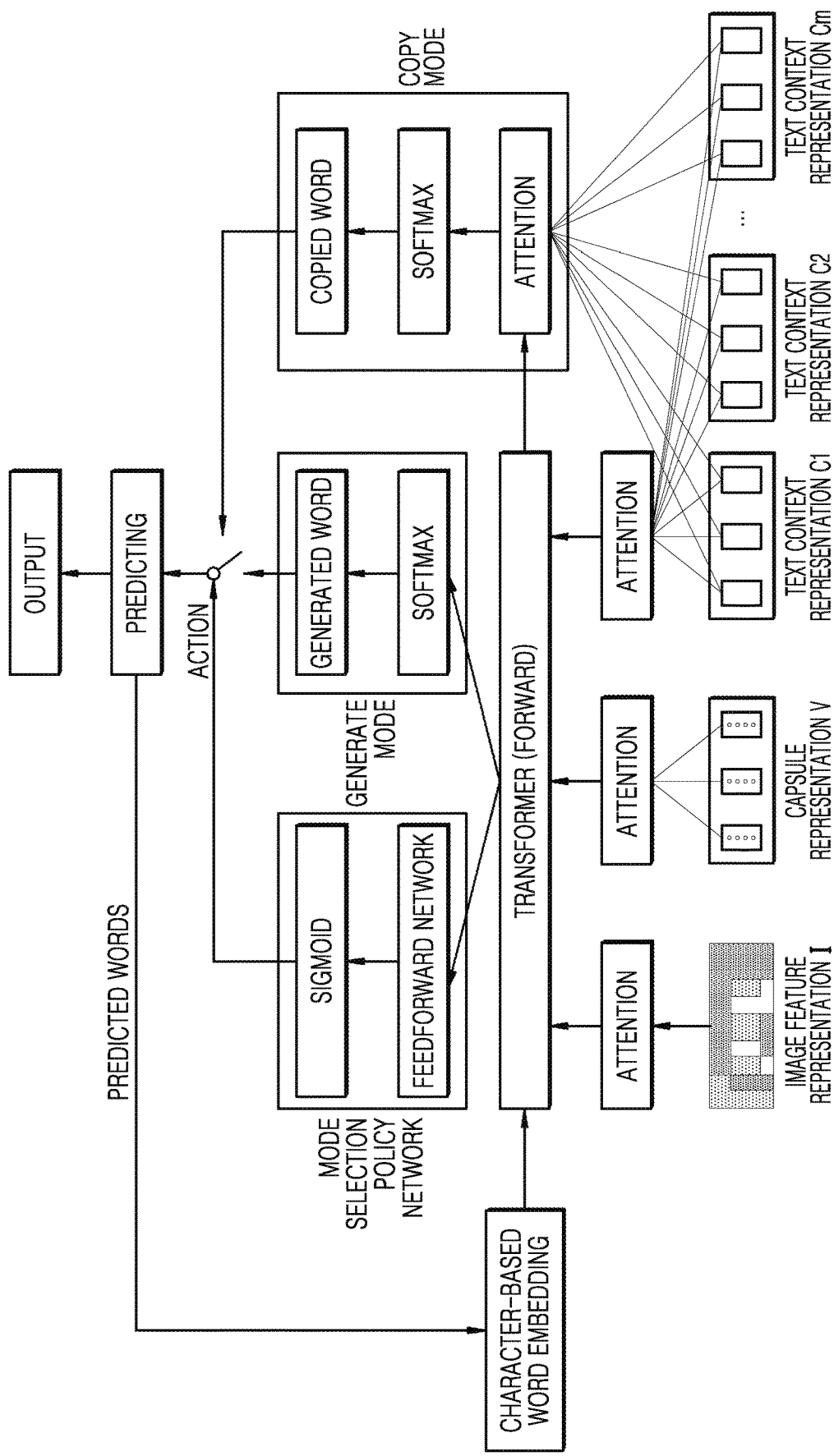
FIG. 11 is a schematic diagram of keyword prediction during decoding according to an embodiment of the disclosure.

Specifically, if the target prediction mode is the second prediction mode, determining the prediction word corresponding to the target prediction mode based on the encoded result includes: determining, based on the encoded result, the weight corresponding to each word contained in the text content in the image to be processed; and based on the weight of each word, determining the prediction word corresponding to the target prediction mode. Specifically, the image feature information includes text representation information and image visual information. Wherein, the text representation information includes at least one of text visual information and text content. The encoded result includes a text context representation and an image feature representation. The text context representation is obtained based on text representation information, and the image feature representation is obtained based on the image visual information. Based on the encoded result, determining the weight corresponding to each word contained in the text content in the image to be processed, includes: obtaining the hidden vector corresponding to the current decoding time operation based on the encoded result and through the feature fusion processing; and determining the weight corresponding to each word contained in the text content in the image to be processed based on the text context representation and the hidden vector. Specifically, based on the text context representation and the hidden vector, determining the weight corresponding to each word contained in the text content in the image to be processed may specifically include: determining the score corresponding to each word contained in the text content in the image to be processed based on the text context representation and the hidden vector; and obtaining the weight corresponding to each word based on the score corresponding to each word. In the embodiment of the disclosure, as shown in FIG. 11, the feature representation of each word contained in the text content in the image to be processed is output result (that is the output result of the Transformer (forward) network module (Transformer Decoder module)) of the Transformer (forward), and then the weight of the feature representation of each word is obtained based on the output result of the forward Transformer and the text context representation (C1, C2, . . . , Cm) corresponding to each text line through attention mechanism. In the embodiment of the disclosure, the Transformer (forward) may also be as shown in FIG. 16, wherein, the input information of the Transformer (forward) is the image feature representation I, the text context representation C and the capsule representation V, and the output information is the feature representation of each word contained in the text content in the image to be processed.

Specifically, determining the feature representation of each word contained in the text content in the image to be processed based on the encoded result includes: determining the feature representation of each word contained in the text content in the image to be processed based on the encoded result and the predicted word. In the embodiment of the disclosure, the predicted word is a word predicted before the current decoding time operation. For example, in the above embodiment, it is mentioned that for the image to be processed, the corresponding keyword sequence is [<s>, Beauty, <s>, MYER, <s>, Sand, &, Sky, </s>], then in the fourth decoding time operation, "<s>," "Beauty," and "<s>" are taken as the predicted words.

Further, after obtaining the feature representation of each word contained in the text content in the image to be processed based on the above embodiment, based on the weight of the feature representation of each word, the feature representations of the words are fused, and the predicted word is obtained based on the fused feature representation.

In the following embodiment, each decoding time operation is taken as an example to describe the manner of predicting keywords. Further, in the embodiment of the disclosure, as shown in FIG. 7 and FIG. 11, when the image feature representation I, the text context representation C of the text line and the capsule representation V are decoded by the decoder, the image feature representation I, the text context representation C of the text line and the capsule representation V are subjected to the attention mechanism to perform the weighted average processing on the input features, the information processed by the attention mechanism and the predicted words are input to the Transformer (forward) network (that is, the Transformer (forward) network module) by means of word embeddings, and the output result is passed to the mode selection network, to determine the word to be predicted is the word which is copied based on the copy mode or the word which is generated by the generate mode, thereby outputting the prediction word and further the corresponding keyword. In the embodiment of the disclosure, the foregoing Transformer (forward) network module may be a single network, or may be stacked at least twice. It is not limited in the embodiments of the disclosure.

Specifically, based on the encoded result corresponding to the image feature information and encoded result corresponding to the text information as well the predicated word, determining the prediction mode of the word sequence corresponding to the current decoding time operation includes: the text line representation corresponding to each text line, the text context representation corresponding to the text line and the capsule vectors being processed through the attention mechanism respectively to obtain the processed result; performing the feature fusion processing on the processed result and the predicted word to obtain the feature fusion result; and based on the feature fusion result, determining the prediction mode of the prediction word corresponding to the current decoding time operation.

FIG. 11 is a schematic diagram of keyword prediction during decoding according to an embodiment of the disclosure.

Referring to FIG. 11, at each decoding time operation, the image feature representation I, the capsule representation V, and the text context representation C (text context representation C1, text context representation C2 . . . text context representation Cm) are processed by the attention processing mechanism to obtain the weighted average information, a feature fusion processing is performed on the word embeddings corresponding to the predicted words (which is the information after character-based word embeddings processing on predicated words) and the weighted averaged information by the forward Transformer network, and the fused information (which may also be referred to as the hidden state representation h of the current time operation of the forward Transformer) is passed to a mode selection policy network for mode selection, for generating a decision action for determining that the prediction word to be output is the word which is generated based on the generate mode or the word which is copied based on the copy mode. In the embodiment of the disclosure, the input in the mode selection network is the fused information (may also be referred to as the hidden state representation h of the forward Transformer), the output activation function Sigmoid calculation mode selection policy P (a; h) is used, and the action is obtained by sampling in the selection policy distribution P (a; h), that is action ~ P(action; h). The action obtained in the embodiment of the disclosure is used to determine whether the prediction mode corresponding to the current decoding time operation is the first prediction mode (generate mode) or the second prediction mode (copy mode), in other words, in the embodiment of the disclosure, the obtained action is used to determine whether the word predicted at the current decoding time operation is predicted through the first prediction mode (generate mode) or predicted through the second prediction mode (copy mode). Further, for example, the action may be 0 or 1, if the action is 0, it represents that the prediction mode corresponding to the current decoding time operation is the first prediction mode (generate mode), and if the action is 1, it represents that the prediction mode corresponding to the current decoding time operation is the second prediction mode (copy mode).

Further, predicting a word through the first prediction mode (generate mode) is to predict a new word according to a predefined common word dictionary. Specifically, the output hidden representation h of the forward Transformer at the current time operation is input to the Softmax layer to calculate the probability distribution on the predefined common word dictionary, that is Softmax(Wh), wherein $W \in R^{|V|*d}$ is the linear transformation parameter matrix, $|V|$ is the size of the common word dictionary, and d represents the vector dimension of the hidden representation h. The common word with the highest probability is taken as the word to be generated, and the common word with the highest probability is the word predicted at the current decoding time operation. In the embodiment of the disclosure, when the generate mode is used to output the prediction word, the word sequence with the highest probability is selected from the predefined common dictionary instead of simply copying the words in the input text lines recognized by OCR. In other words, while predicting the words in the generate mode, rather than the words in the text lines recognized by OCR being directly used as the output words (used as the output predicted words), the keywords predicted in the generate model may be used as the output words, so that the predicted keyword errors due to the OCR-ed text content errors may be avoided.

Further, the word predicted by the copy mode is to copy a word from the input word sequence as the word predicted at the current decoding time operation. Specifically, based on the hidden vector h of the forward Transformer at the current decoding time operation and the text context representation C, the probability distribution on the input word sequence is calculated by using the Softmax in combination with the attention mechanism, the input word with the highest score is selected as the copied word for the new word prediction (that is, obtaining the hidden vector at the current decoding time operation based on the encoded result and through the feature fusion processing (herein the feature fusion processing refers to the forward Transformer), and determining the score corresponding to each word contained in the text content in the image to be processed based on the text context representation C and the hidden vector at the current decoding time operation, and then obtaining the weight (probability distribution) corresponding to each word through Softmax, thereby obtaining the copied words). It can be understood that, performing the word prediction through the copy mode is to determine the word with the highest score from the current text line sequence (in fact, the OCR-ed text), as the word predicted at the current decoding time operation. In the embodiment of the disclosure, performing weighted average processing through the attention mechanism while performing word prediction in the copy mode, that is, adjusting the weight of the feature representation of each word through the forward Transformer and the text context representation of each text line, which helps reduce score of the OCR-ed error words, thereby further improving the accuracy of the predicted keywords.

In the above embodiment, the keyword extraction model is used to extract the keywords from the image to be processed to obtain the keywords corresponding to the image to be processed. The model (keyword extraction model) used in the embodiment of the disclosure is a deep learning network. Model training needs to be built on the basis of a large-scale training data set. However, because manual annotating this type of data is relatively complex and exists heavy labelling differences, manually labelling large-scale text image keyword extraction data is time-consuming and has a high cost. A method for obtaining training data is provided in an embodiment of the disclosure to obtain training data corresponding to the above keyword extraction model.

(1) Training Data Preparation:

The training data is divided into two categories, synthetic screenshot corpus and labeled corpus (the labelling corpus may include: manual labelling corpus and automatic labelling corpus):

1) Obtaining Synthetic Screenshot Corpus:

It uses open resources crawled from the network to synthesize image data. The operation flow is shown in FIG. 12: in the embodiment of the disclosure, the synthesized image in FIG. 12 is only exemplary, and the content in the synthesized image in FIG. 12 is not claimed.

FIG. 12 is a schematic diagram of synthesizing corpus based on model training according to an embodiment of the disclosure.

Referring to FIG. 12, first, the text data is extracted from the web, such as the abstract and keywords of the scientific articles. Here, "Title" and "Abstract" are used together as the document, and the keywords of the article are used as the keywords. For example, in FIG. 12, the "Title" section and the "Abstract" section in the scientific articles serve together as the document, and the "Keywords" section is used as the keywords.

Secondly, the collected text data (including the abstract and keywords of the articles) and image data are combined to synthesize a large-scale labelled corpus, and all keywords of the articles are used as keywords of the synthesized image.

2) Labelled Corpus:
First, a certain amount of formal image data is collected, such as screenshot data, from smartphone users;
Then, these data is labelling, for example, manually labelling these data through crowdsourcing and other methods.

Figure 13:
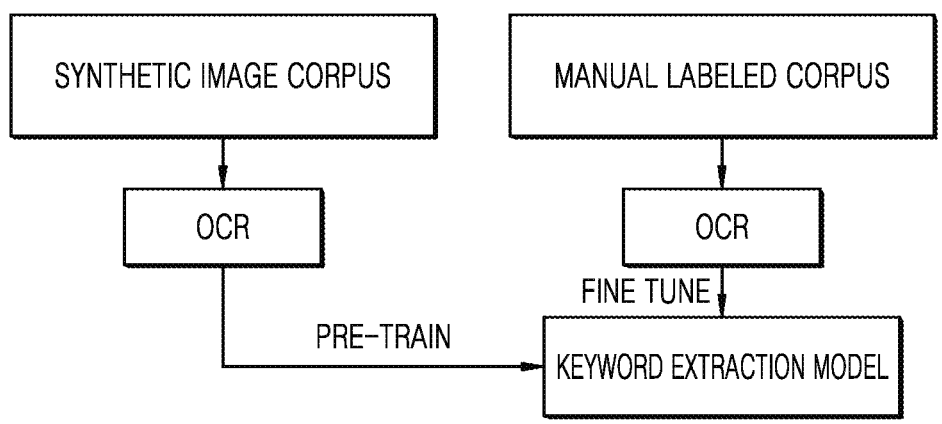
FIG. 13 is a schematic diagram of obtaining keyword extraction model by model training according to an embodiment of the disclosure.

FIG. 13 is a schematic diagram of obtaining keyword extraction model by model training according to an embodiment of the disclosure.

(2) Model Training:
Model training and prediction method. This method includes three operations, referring to FIG. 13:
1) Pre-training keyword extraction model using synthetic screenshot corpus; and
2) Fine-tuning the pre-trained model using the labeled screenshot corpus.

Figure 14:
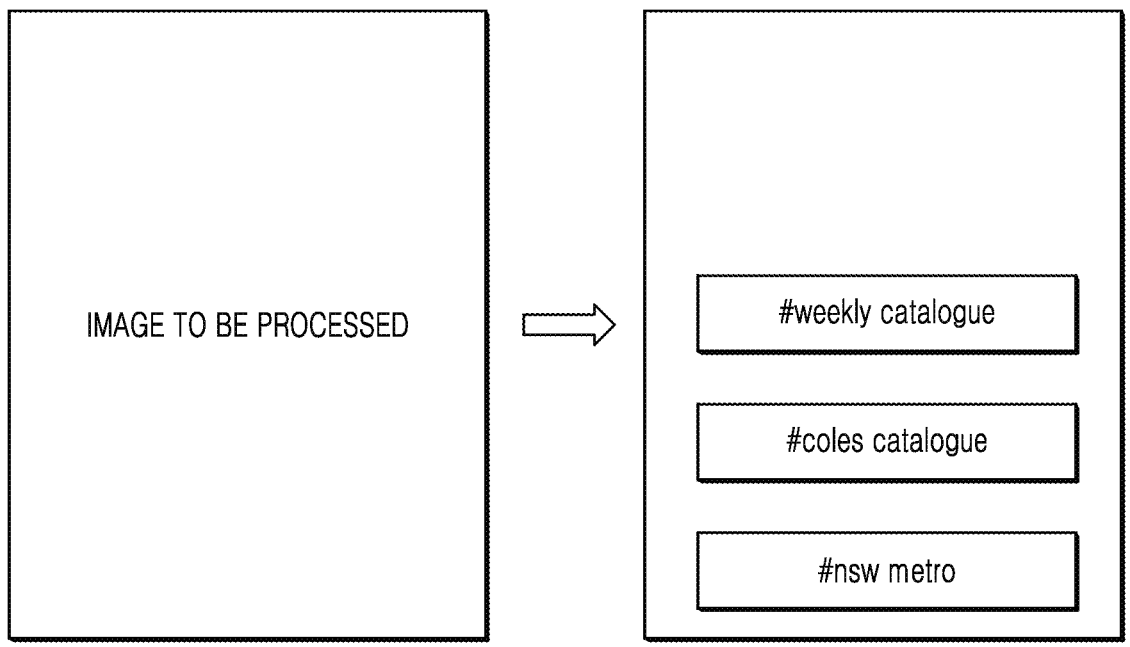
FIG. 14 is an example diagram of editing image tags based on keyword extraction according to the embodiment of the disclosure.

FIG. 14 is an example diagram of editing image tags based on keyword extraction according to the embodiment of the disclosure.

In the above embodiment, a method for extracting a keyword sequence from an image to be processed to obtain the keywords, and a method for training the keyword model used for extracting keyword sequence are introduced. The method for extracting keywords from the image to be processed may be applied to the many application scenarios, such as image tag editing and smart search. For image tag editing, when a user wants to add text tags to a screenshot, the keyword extraction may provide users with some tag candidates, then the user may select some tags from these tag candidates as the tags of the image, or the user may edit the tags by himself. Referring to FIG. 14, the keywords "#weekly catalogue," "#ooles catalogue," and "#nsw metro" are extracted from the image to be processed as candidate tags, wherein "#" represents a keyword tag (also may be referred to as an HashTag tag), such that the user may select tags therefrom as the tags of the image. For smart search, when the user wants to know the image-related information, the keyword extraction in the tool may automatically extract the keywords in the image and provide them to the user. If the user selects a tag (such as tag 1), then the tool will present the relevant search results to the user, that is, the search result corresponding to tag 1, as shown in FIG. 15.

Figure 15:
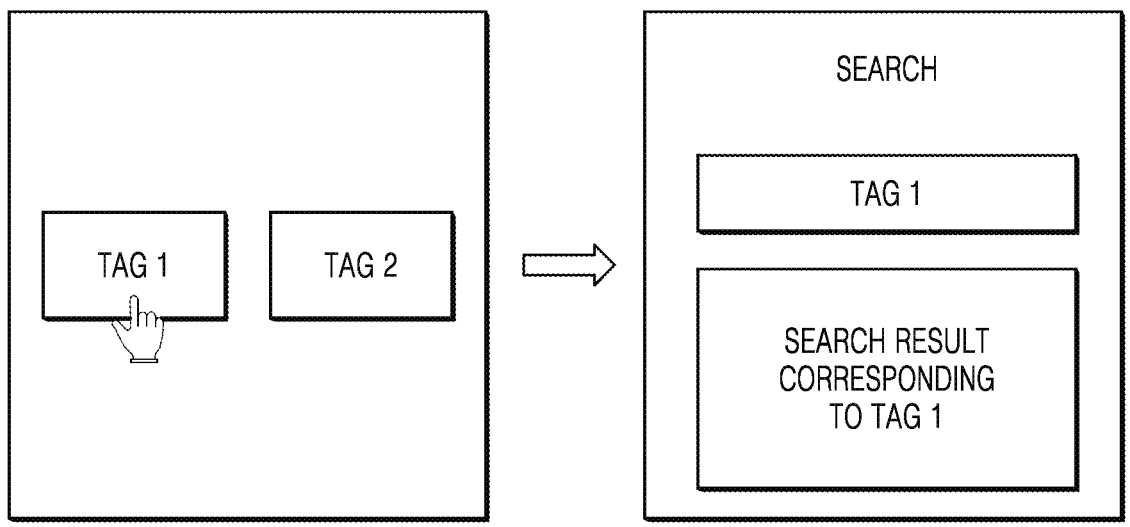
FIG. 15 is an example diagram of an intelligent search based on keyword extraction according to an embodiment of the disclosure.

FIG. 15 is an example diagram of an intelligent search based on keyword extraction according to an embodiment of the disclosure.

Further, in the above embodiments, adding of visual information (at least one of image visual information and text visual information) to the feature information on which keywords are extracted from the image to be processed may significantly improve the performance of the keyword extraction model and improve keyword extraction effect. The following experimental data show that adding of visual information may significantly improve the performance of the keyword extraction model and improve the keyword extraction effect. Specifically, in the embodiment of the disclosure, only the visual information of the position of each text line in the image to be processed and the visual information of the word position in the text line of each word in each text line are taken in account. The embodiment of the disclosure uses 1700 manually tagged Chinese screenshots as the experimental data, of which 1000 screenshots are used as the training set, and 700 screenshots are used as the test set, and the experimental results obtained are shown in Table 1.

TABLE 1

| Method | Accuracy | Recall rate | F1 | Prec@5 | Prec@10 |
| --- | --- | --- | --- | --- | --- |
| Conventional method (visual information not contained in feature information) | 44.7% | 30.5% | 33.4% | 45.5% | 44.8% |
| Disclosure (visual information contained in feature information) | 45.9% | 30.8% | 34.0% | 46.5% | 46.0% |

Where, Prec@5 and Prec@10 respectively indicate the average accuracy of the top 5 and top 10 scores of the keyword prediction ranking by the keyword extraction model. Furthermore, according to Table 1, it can be known that the method of the embodiment of the disclosure (that is, extracting based on feature information containing visual information when extracting keywords) has higher accuracy, recall rate, F1, Prec@5, and Prec@10 than the method for keyword extraction in the original model without using visual information. Therefore, the method for keyword extraction in the embodiment of the disclosure may significantly improve the performance of the keyword extraction model and improve the keyword extraction effect.

Further, in the embodiment of the disclosure, extracting the image of English text content and extracting the English keywords are taken as an example for description, but the model mentioned in the embodiment of the disclosure is also applicable to perform keyword extraction on the image of text content in other language, wherein the extracted keywords may be keywords in corresponding language.

Figure 17:
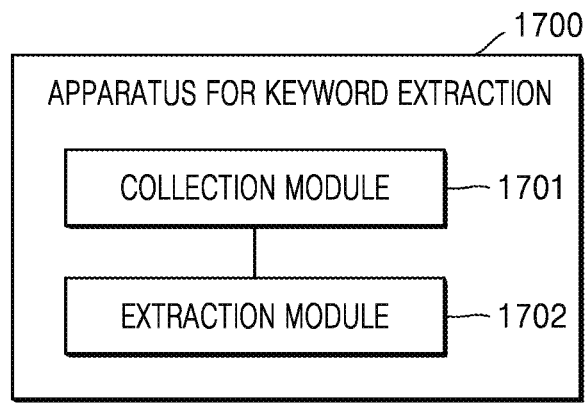
FIG. 17 is a schematic structural diagram of an apparatus for keyword extraction according to an embodiment of the disclosure.

The above embodiment introduces the keyword extraction method from the perspective of the method flow. The following embodiment introduces the apparatus for keyword extraction from the perspective of the virtual device. The apparatus for keyword extraction introduced in the following embodiment is applicable to the above method embodiment, as shown below:

FIG. 17 is a schematic structural diagram of an apparatus for keyword extraction according to an embodiment of the disclosure.

An embodiment of the disclosure provides an apparatus for keyword extraction.

Referring to FIG. 17, the apparatus for keyword extraction 1700 includes a collection module 1701 and an extraction module 1702, wherein the collection module 1701 is configured to collect feature information corresponding to an image to be processed; and the extraction module 1702 is configured to extract keywords from the image to be processed based on the feature information.

In a possible implementation manner of the embodiment of the disclosure, the feature information includes at least one of text representation information and image visual information; the text representation information includes at least one of text content and text visual information.

In another possible implementation manner of the embodiment of the disclosure, the text visual information includes text visual information corresponding to each text line in the image to be processed;

For one text line, the text visual information corresponding to the text line includes at least one of the following: a text feature map corresponding to the text line; a text position of the text line in the image to be processed; word positions in the image to be processed in the text line; and word relative positions in the text line in the text line.

In another possible implementation manner of the embodiment of the disclosure, when the extraction module 1702 extracts keywords from an image to be processed based on feature information, the extraction module 1702 is specifically configured to encode the feature information to obtain the encoded result of the feature information; and extract keywords from the image to be processed based on the encoded results.

In another possible implementation manner of the embodiment of the disclosure, the feature information includes text representation information and image visual information, wherein the text representation information includes at least one of text visual information and text content.

The encoded result includes text context representation, image feature representation, at least one of structure information and topic information representations of all text lines;

wherein, the text context representation is obtained based on the text representation information, the image feature representation is obtained based on the image visual information, and the structure information and the topic information representations of all text lines are obtained based on the text context representation.

In another possible implementation manner of the embodiment of the disclosure, when the extraction module 1702 extracts keywords from an image to be processed based on an encoded result, the extraction module 1702 is specifically configured to determine a target prediction mode corresponding to each decoding time operation and a prediction word corresponding to the target prediction mode based on the encoded result; output a prediction word corresponding to each decoding time operation; and obtain keywords based on the prediction word sequence of all decoding time operations.

In another possible implementation manner of the embodiment of the disclosure, when for one decoding time operation, the extraction module 1702 determines a target prediction mode corresponding to the decoding time operation and a prediction word corresponding to the target prediction mode based on the encoded result, the extraction module 1702 is specifically configured to determine a prediction word of each pre-configured prediction mode corresponding to the decoding time operation and the target prediction mode corresponding to the decoding time operation based on the encoded result, and obtain a prediction word corresponding to a target pre-stored mode based on the prediction word of each prediction mode and the target prediction mode corresponding to the decoding time operation; and determine the target prediction mode corresponding to the decoding time operation from the each pre-configured prediction mode based on the encoded result, and obtain the prediction word corresponding to the target prediction mode based on the encoded result.

In another possible implementation manner of this embodiment of the disclosure, the pre-configured prediction mode includes a first prediction mode in which the keyword prediction is performed based on a common word dictionary; and a second prediction mode in which the keyword prediction is performed based on all words in input text lines.

In another possible implementation manner of the embodiment of the disclosure, if the target prediction mode is the second prediction mode, when the extraction module 1702 determines the prediction word corresponding to the target prediction mode based on the encoded result, the extraction module 1702 is specifically configured to determine a weight corresponding to each word contained in the text content in the image to be processed based on the encoded result; and determine the prediction word corresponding to the target prediction mode based on the weight corresponding to each word.

In another possible implementation manner of the embodiment of the disclosure the image feature information includes text representation information and image visual information, wherein the text representation information includes at least one of text visual information and text content, and the encoded result includes a text context representation and an image feature representation, wherein the text context representation is obtained based on the text representation information, and image feature representation is obtained based on the image visual information.

When the extraction module 1702 determines the weight corresponding to each word contained in the text content in the image to be processed based on the encoded result, the extraction module 1702 is specifically configured to determining a hidden vector corresponding to the current decoding time operation based on the encoded result and through the feature fusion processing; and determining a weight corresponding to each word contained in the text content in the image to be processed based on the text context representation and the hidden vector.

In another possible implementation manner of the embodiment of the disclosure, if the feature information includes text representation information, and the text representation information includes at least one of text visual information and text content, when the extraction module 1702 encodes the feature information to obtain an encoded result corresponding to the feature information, the extraction module 1702 is specifically configured to encode the text representation information to obtain the text line representation; encode the text line representation to obtain the text context representation; and encode the text context representation to obtain the structure information representation and the topic information representation of all input text lines.

In another possible implementation manner of the embodiment of the disclosure, if the feature information includes text representation information, wherein the text representation information includes text content, and the text content includes a word sequence corresponding to each text line, for one text line, the text content of the text line includes the word sequence corresponding to the text line.

Wherein, for one text line, when the extraction module 1702 encodes the text content to obtain the text line representation, the extraction module 1702 is specifically used to encode the word sequence corresponding to the text line to obtain a character-based word representation; and determine the text line representation corresponding to the text line based on the character-based word representation.

In another possible implementation manner of the embodiment of the disclosure, the text line representation includes text line representation corresponding to at least one text line, wherein when the extraction module 1702 encodes the text line representation to obtain the text context representation of the text line, the extraction module 1702 is specifically configured to encode each text line representation respectively to obtain a local text context representation corresponding to each text line; encode all text line representations as a whole to obtain a global text context representation corresponding to all the text lines; and determine the text context representation corresponding to each text line based on the local text context representation corresponding to each text line and the global text context representation corresponding to all the text lines.

The embodiment of the disclosure provides an apparatus for keyword extraction. Compared with the existing technology, in the embodiment of the disclosure, feature information corresponding to an image to be processed is collected, and then the keyword is extracted from the image to be processed based on the feature information. That is, in the embodiment of the disclosure, the feature information collected from the image to be processed may be used to extract the keywords from the image to be processed.

The apparatus for keyword extraction in the embodiment of the disclosure may execute the method for keyword extraction shown in the foregoing method embodiment of the disclosure, and the implementation principles thereof are similar, and are not repeated here.

In the above embodiment, a method for keyword extraction is introduced from the perspective of the method flow and an apparatus for keyword extraction is introduced from the perspective of the virtual device. The following embodiment describes an electronic device that may be used to execute the above method for keyword extraction shown in the method embodiment. In the embodiment of the disclosure, the electronic device may be a terminal device or a server, which is not limited thereto. For a description of the electronic device, refer to the following embodiments.

Figure 18:
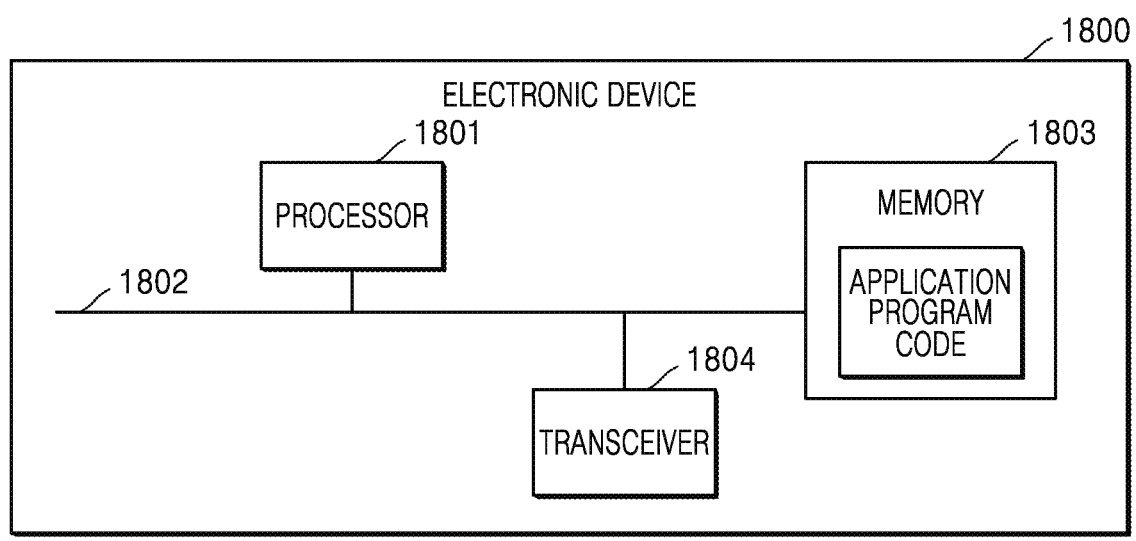
FIG. 18 is a schematic structural diagram of an electronic device according to an embodiment of the disclosure.

FIG. 18 is a schematic structural diagram of an electronic device according to an embodiment of the disclosure.

An embodiment of the disclosure provides an electronic device.

Referring to FIG. 18, the electronic device 1800 shown in FIG. 18 includes a processor 1801 and a memory 1803. Wherein, the processor 1801 and the memory 1803 are connected, for example, through a bus 1802. Optionally, the electronic device 1800 may further include a transceiver 1804. It should be noted that, in practical applications, the number of the transceiver 1804 is not limited to one, and the structure of the electronic device 1800 does not limit the embodiments of the disclosure.

The processor 1801 may be a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or execute various logical blocks, modules, and circuits described in connection with the disclosure of the disclosure. The processor 1801 may also be a combination that implements computing functions, for example, a combination including one or more microprocessors, a combination of a DSP and a microprocessor, and the like.

The bus 1802 may include a path for transmitting information between the above components. The bus 1802 may be a peripheral component interconnect (PCI) bus, an extended industry standard architecture (EISA) bus, or the like. The bus 1802 may be divided into an address bus, a data bus, a control bus, and the like. For ease of representation, only one thick line is used in FIG. 18, but it does not mean that there is only one bus or one type of bus.

The memory 1803 may be a read only memory (ROM) or other type of static storage device that may store static information and instructions, a random access memory (RAM) or other type of dynamic storage device that may store information and instructions, or an electrically erasable programmable read only memory (EEPROM), compact disc read only memory (CD-ROM) or other optical storage, or optical disk storage (including compact discs, laser discs, compact discs, digital versatile discs, Blu-ray discs, etc.), magnetic disk storage media or other magnetic storage devices, or any other medium capable of carrying or storing desired program codes in the form of instructions or data structures and accessible by a computer, but not limited to this.

The memory 1803 is configured to store application program codes for executing the solution of the disclosure, and the processor 1801 controls the execution. The processor 1801 is configured to execute application program codes stored in the memory 1803 to implement the content shown in any one of the foregoing method embodiments.

An embodiment of the disclosure provides an electronic device. The electronic device in the embodiment of the disclosure includes: a memory and a processor; at least one program stored in the memory. Compared to the existing technology, when the at least one program is executed, it is used to implement the following: in the embodiment of the disclosure, collecting the feature information corresponding to the image to be processed, the feature information including text representation information and image visual information, and extracting keywords from the image to be processed based on the feature information. The text representation information includes text content and text visual information corresponding to each text line in the image to be processed. That is, in the embodiment of the disclosure, the feature information collected from the image to be processed may be used to extract the keywords from the image to be processed.

An embodiment of the disclosure provides a computer-readable storage medium. A computer program is stored on the computer-readable storage medium, and when the computer program is run on the computer, the computer may execute corresponding content in the foregoing method embodiments. Compared with the existing technology, the embodiment of the disclosure collects feature information corresponding to an image to be processed and then extracts the keywords from the image to be processed based on the feature information. That is, in the embodiment of the disclosure, the feature information collected from the image to be processed may be used to extract the keywords from the image to be processed.

It should be understood that although the operations in the flowchart of the drawings are sequentially displayed in accordance with the directions of the arrows, these operations are not necessarily performed in the order indicated by the arrows. Unless explicitly stated herein, the execution of these operations is not strictly limited, and they may be performed in other orders. Moreover, at least a part of the operations in the flowchart of the drawing may include multiple sub-operations or multiple stages. These sub-operations or stages are not necessarily performed at the same time, but may be performed at different times. It is not necessarily performed sequentially, but may be performed in turn or alternately with other operations or at least a part of the sub-operations or stages of other operations.

While the disclosure has been shown and described with reference to various embodiments thereof, it will be understood by those skilled in the art that various changes and form and details may be made therein without departing from the spirit and scope of the disclosure as defined by the appended claims and their equivalents.

What is claimed is:

1. A method for keyword extraction, the method comprising:
   collecting feature information corresponding to an image to be processed, the feature information including text representation information and image visual information, the text representation information including text content and text visual information corresponding to a text line in the image to be processed, the text visual information comprising a text feature map corresponding to the text line, the text feature map including text line visual features obtained by encoding visual information including a font size, a font color, and a font shape of the text line; and
   based on the image visual information and the text representation information including the text content and the text visual information including the text feature map including text line visual features obtained by encoding the visual information including the font size, the font color, and the font shape of the text line, extracting keywords from the image to be processed, the keywords extracted from the image to be processed being representative words or phrases summarizing the image to be processed.

2. The method of claim 1, wherein, for the text line, the text visual information corresponding to the text line further comprises at least one of:
   a text position in the image to be processed;
   word positions in the text line in the image to be processed; or
   word relative positions in the text line.

3. The method of claim 2, wherein the extracting of the keywords from the image to be processed comprises:
   encoding the feature information to obtain an encoded result of the feature information; and
   based on the encoded result, extracting keywords from the image to be processed,
   wherein the encoded result includes a text context representation, an image feature representation, and at least one of structure information or topic information representations of all text lines,
   wherein the text context representation is obtained based on the text representation information,
   wherein the image feature representation is obtained based on the image visual information, and
   wherein the structure information and topic information representations of all text lines are obtained based on the text context representation.

4. The method of claim 3, further comprising:
   decoding the text context representation, the image feature representation, and the at least one of structure information or topic information representations of all text lines; and
   based on the decoding, obtaining a keyword sequence comprising the keywords extracted from the image to be processed.

5. The method of claim 3, wherein the extracting of the keywords from the image to be processed further comprises:
   based on the encoded result, determining target prediction modes corresponding to each decoding time operation, respectively, and determining a prediction word corresponding to the target prediction modes;
   outputting prediction words corresponding to each decoding time operation, respectively; and
   based on a prediction word sequence of all decoding time operations, obtaining keywords.

6. The method of claim 5, wherein, for a decoding time operation, determining a target prediction mode corresponding to the decoding time operation and determining a prediction word corresponding to the target prediction mode comprises at least one of:
   based on the encoded result, determining prediction words of each pre-configured prediction mode corresponding to the decoding time operation, respectively, and determining the target prediction mode corresponding to the decoding time operation, and based on the prediction words of each pre-configured prediction mode and the target prediction mode corresponding to the decoding time operation, obtaining a prediction word corresponding to a target pre-stored mode; or
   based on the encoded result, determining the target prediction mode corresponding to the decoding time operation from each pre-configured prediction mode, and obtaining the prediction word corresponding to the target prediction mode.

7. The method of claim 6, wherein a pre-configured prediction mode comprises:
a first prediction mode in which a keyword prediction is performed based on a common word dictionary; and
a second prediction mode in which the keyword prediction is performed based on all words in input text lines.

8. The method of claim 7, wherein the determining of the prediction word corresponding to the target prediction mode comprises:
in response to the target prediction mode being the second prediction mode, determining a weight corresponding to each word contained in the text content in the image to be processed based on the encoded result; and
based on the weight corresponding to each word, determining the prediction word corresponding to the target prediction mode.

9. The method of claim 8, wherein the determining of the weight corresponding to each word contained in the text content in the image to be processed based on the encoded result comprises:
based on the encoded result, obtaining a hidden vector corresponding to a current decoding time operation through feature fusion processing; and
based on the text context representation and the hidden vector, determining the weight corresponding to each word contained in the text content in the image to be processed.

10. The method of claim 3, wherein the encoding of the feature information to obtain the encoded result corresponding to the feature information comprises at least one of:
encoding the text representation information to obtain a text line representation;
encoding the text line representation to obtain the text context representation; or
encoding the text context representation to obtain a representation of the structure information and the topic information representations of all text lines.

11. The method of claim 10,
wherein the text content includes a word sequence corresponding to the text line,
wherein, for one text line, the text content of the one text line includes a word sequence corresponding to the one text line, and
wherein, for the one text line, encoding the text content to obtain one text line representation comprises:
encoding the word sequence corresponding to the one text line to obtain a character-based word representation; and
based on the character-based word representation, determining the one text line representation corresponding to the one text line.

12. The method of claim 10,
wherein the text line representation comprises a text line representation corresponding to at least one text line, and
wherein the encoding of the text line representation to obtain the text context representation comprises:
encoding the text line representation respectively to obtain a local text context representation corresponding to the text line;
encoding all text line representations as a whole to obtain a global text context representation corresponding to all text lines; and
based on the local text context representation corresponding to the text line and the global text context representation corresponding to all text lines, determining the text context representation corresponding to the text line.

13. A non-transitory computer-readable storage medium having stored thereon computer programs which, when are executed by a processor, perform the method of claim 1.

14. The method of claim 1,
wherein the visual information used to obtain the text line visual features further includes a text background color, structure information, and border information, and
wherein the text line visual features are further obtained by encoding the visual information including the font size, the font color, the font shape of the text line, the text background color, the structure information, and the border information.

15. An electronic device for keyword extraction, the electronic device comprising:
one or more processors; and
memory storing one or more programs including instructions which, when executed by the one or more processors, cause the electronic device to:
collect feature information corresponding to an image to be processed, the feature information including text representation information and image visual information, the text representation information including text content and text visual information corresponding to a text line in the image to be processed, the text visual information comprising a text feature map corresponding to the text line, the text feature map including text line visual features obtained by encoding visual information including a font size, a font color, and a font shape of the text line, and
based on the image visual information and the text representation information including the text content and the text visual information including the text feature map including text line visual features obtained by encoding the visual information including the font size, the font color, and the font shape of the text line, extract keywords from the image to be processed, the keywords extracted from the image to be processed being representative words or phrases summarizing the image to be processed.

16. The electronic device of claim 15, wherein, for the text line, the text visual information corresponding to the text line comprises at least one of:
a text position in the image to be processed;
word positions in the text line in the image to be processed; or
word relative positions in the text line.

17. The electronic device of claim 16,
wherein the one or more programs further include instructions which, when executed by the one or more processors, cause the electronic device to:
encode the feature information to obtain an encoded result of the feature information, and
based on the encoded result, extract keywords from the image to be processed,
wherein the encoded result includes a text context representation, an image feature representation, and at least one of structure information or topic information representations of all text lines,
wherein the text context representation is obtained based on the text representation information,
wherein the image feature representation is obtained based on the image visual information, and wherein the structure information and topic information representations of all text lines are obtained based on the text context representation.

18. The electronic device of claim 17, wherein the one or more programs further include instructions which, when executed by the one or more processors, cause the electronic device to:
- decode the text context representation, the image feature representation, and the at least one of structure information or topic information representations of all text lines, and
- based on the decoding, obtain a keyword sequence comprising the keywords extracted from the image to be processed.

19. The electronic device of claim 17, wherein the one or more programs further include instructions which, when executed by the one or more processors, cause the electronic device to:
- based on the encoded result, determine target prediction modes corresponding to each decoding time operation, respectively, and determining a prediction word corresponding to the target prediction modes,
- output prediction words corresponding to each decoding time operation, respectively, and
- based on a prediction word sequence of all decoding time operations, obtain keywords.

20. The electronic device of claim 19, wherein the one or more programs further include instructions which, when executed by the one or more processors, cause the electronic device to:
- based on the encoded result, determine, for a decoding time operation, prediction words of each pre-configured prediction mode corresponding to the decode time operation, respectively, and determine a target prediction mode corresponding to the decoding time operation, and based on the prediction words of each pre-configured prediction mode and the target prediction mode corresponding to the decoding time operation, obtain a prediction word corresponding to a target pre-stored mode, and
- based on the encoded result, determine the target prediction mode corresponding to the decoding time operation from each pre-configured prediction mode, and obtain the prediction word corresponding to the target prediction mode.

21. The electronic device of claim 20, wherein a pre-configured prediction mode comprises:
- a first prediction mode in which a keyword prediction is performed based on a common word dictionary; and
- a second prediction mode in which the keyword prediction is performed based on all words in input text lines.

* * * * *